(12) United States Patent
Baker

(10) Patent No.: US 8,346,696 B2
(45) Date of Patent: Jan. 1, 2013

(54) COMPUTATIONALLY EFFICIENT SIGNAL CLASSIFIER

(75) Inventor: James Bryan Baker, Kent, WA (US)

(73) Assignee: The Boeing Company, Chicago, IL (US)

(*) Notice: Subject to any disclaimer, the term of this patent is extended or adjusted under 35 U.S.C. 154(b) by 914 days.

(21) Appl. No.: 12/138,597

(22) Filed: Jun. 13, 2008

(65) Prior Publication Data

US 2009/0313188 A1    Dec. 17, 2009

(51) Int. Cl.
*G06N 5/00* (2006.01)
(52) U.S. Cl. .................................................. 706/45
(58) Field of Classification Search .............. 706/45
See application file for complete search history.

(56) References Cited

OTHER PUBLICATIONS

Ye et al (A Machine Learning Algorithm Based on Supervised Clustering and Classification).*
Lim et al ("A Comparison of Prediction Accuracy, Complexity, and Training Time of Thirty-three Old and New Classification Algorithms" 2000).*
Hwang et al ("Top-down Clustering Using Multidimensional Indexes" Feb. 2003).*
Liu et al ("Clustering Through Decision Tree Construction" 2000).*
Pavel Berkhin ("A Survey of Clustering Data Mining Techniques" 2002).*

* cited by examiner

*Primary Examiner* — Lut Wong
(74) *Attorney, Agent, or Firm* — Hope Baldauff Hartman, LLC

(57) ABSTRACT

Methods provided by this description may include receiving input signals for classification, and deriving specified signal parameters from the input signals. These methods may also compare the specified signal parameter to signal parameters derived from training signals, with the training signals being associated with predefined signal classes. These methods may also classify the input signals based on this comparison of the signal parameters, as derived respectively from the input signals in the training signals.

15 Claims, 16 Drawing Sheets

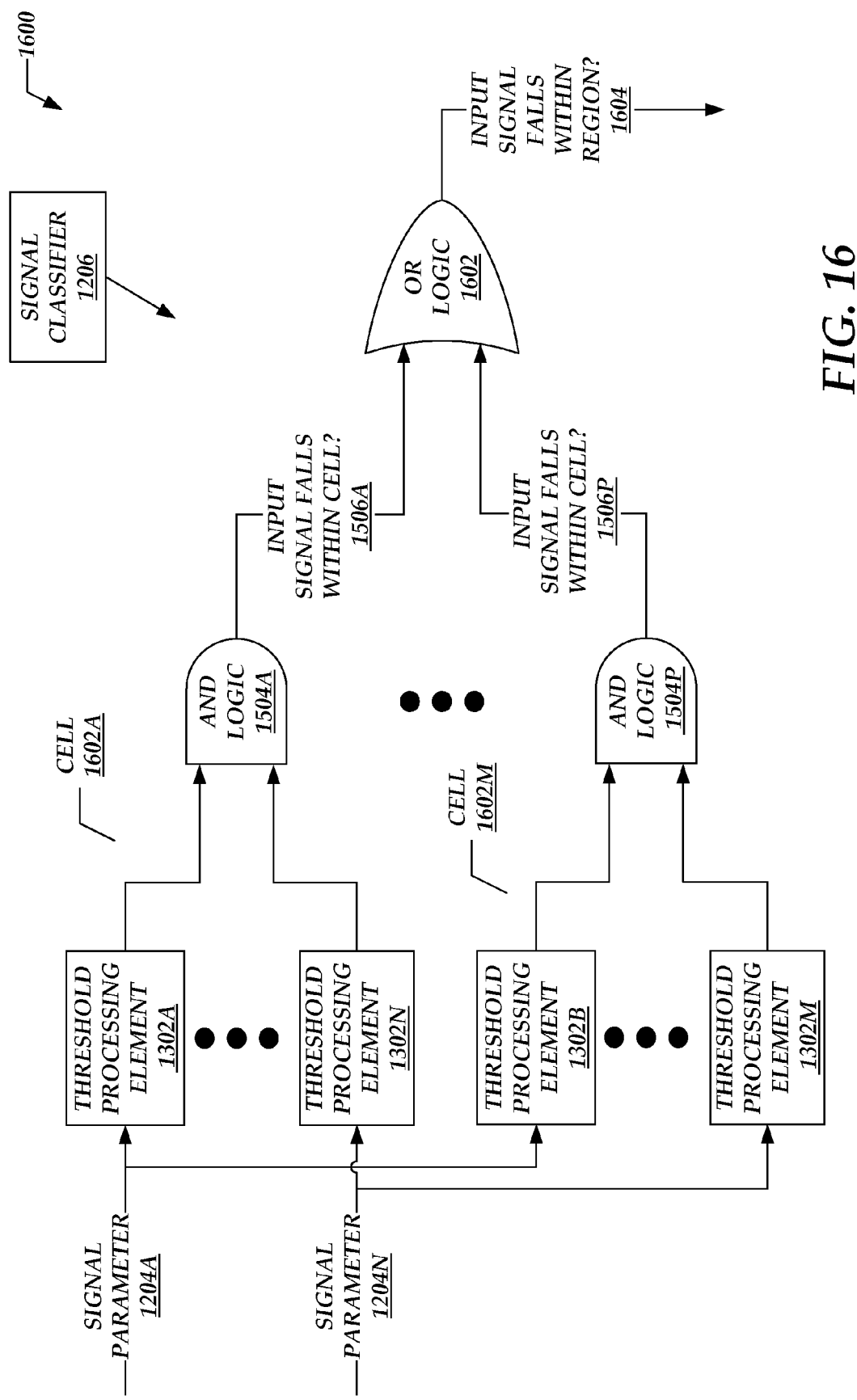

COMPUTATIONALLY EFFICIENT SIGNAL CLASSIFIER

BACKGROUND

Signals may be encountered in a variety of different scientific, engineering, military, medical, and other applications. Generally, the signals are diverse in nature, making it difficult to classify them. Previous techniques or solutions for signal classification may apply to limited and specific set of signals, but these solutions may be somewhat inflexible, in the sense that they work well only for these limited or specific sets of signals.

SUMMARY

It should be appreciated that this Summary is provided to introduce a selection of concepts in a simplified form that are further described below in the Detailed Description. This Summary is not intended to be used to limit the scope of the claimed subject matter.

This description provides tools and techniques for a signal classifier and related systems. Methods provided by this description may include receiving input signals for classification, and deriving specified signal parameters from the input signals. These methods may also compare the specified signal parameters to signal parameters derived from training signals, with the training signals being associated with predefined signal classes. These methods may also classify the input signals based on this comparison of the signal parameters, as derived respectively from the input signals in the training signals.

Methods described herein may include receiving training signals, with the training signals associated respectively with predefined signal classes. The methods may also derive specified signal parameters from the training signals, with the training signals being associated respectively with the signal classes. The specified signal parameters may be stored as associated with the signal classes. The methods may also process the specified signal parameters for classifying input signals based on the signal parameters.

Signal classification systems described herein may include training stages for receiving training signals, with the training signals associated respectively with predefined signal classes. The training stage derives specified signal parameters from the training signals, and associates the signal parameters with the signal classes. The signal classification systems described herein may also include a classifying stage for receiving input signals for classification, with the classifying stage deriving the specified signal parameters from the input signals. The classifying stage also compares the signal parameters computed for the input signals with the signal parameters computed for the training signals, to determine whether to classify the input signals with any of the training signals.

The features, functions, and advantages discussed herein may be achieved independently in various embodiments of the present description or may be combined in yet other embodiments, further details of which can be seen with reference to the following description and drawings.

BRIEF DESCRIPTION OF THE DRAWINGS

FIG. 16 is a diagram illustrating architectures for testing multiple cells within a given region, to determine whether the given input signal falls within any of these cells.

DETAILED DESCRIPTION

Figure 1:
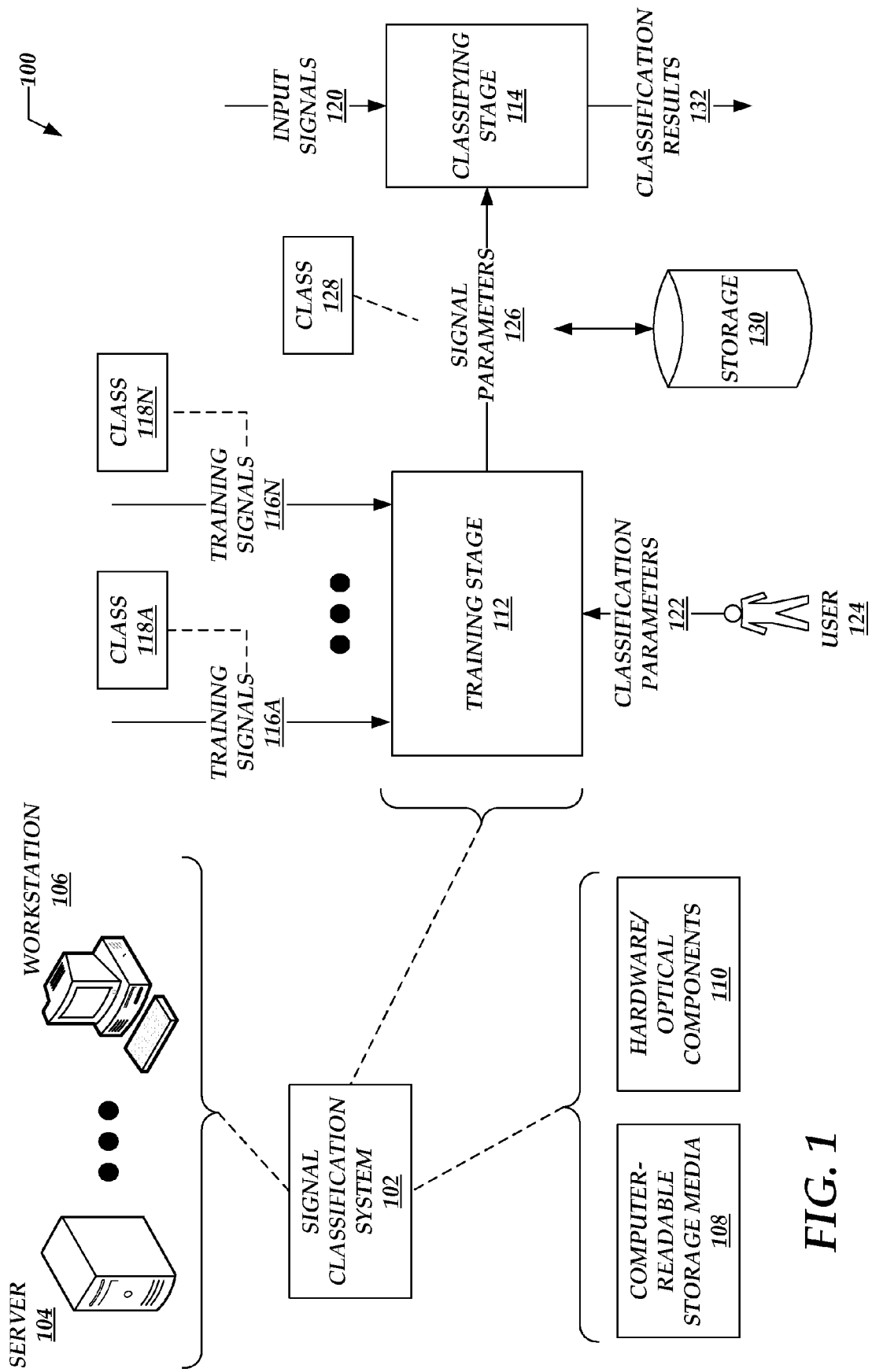
FIG. 1 is a combined block and flow diagram illustrating systems or operating environments for signal classifiers.

The following detailed description discloses various tools and techniques for signal classifiers. This description is provided with reference to the attached drawings, in which various reference numbers are used to associate items in the description with elements shown in the drawings. The first digit of these reference numbers indicates the drawing in which the referenced item first appears.

FIG. 1 illustrates systems or operating environments, denoted generally at 100, for signal classifiers. These systems 100 may include one or more signal classification systems 102. FIG. 1 illustrates several examples of platforms that may host the signal classification system 102. These examples may include one or more server-based systems 104, one or more workstations 106, or other types of computing systems. The workstations 106 may represent mobile computing systems (e.g., laptops, notebooks, and the like), or may represent desktop computing systems that are relatively stationary.

Implementations of this description may include other types of platforms as well, with FIG. 1 providing non-limiting examples. For example, the description herein contemplates other platforms for implementing the signal classifiers, including but not limited to wireless personal digital assistants, smartphones, or the like. The graphical elements used in FIG. 1 to depict various components are chosen only to facilitate illustration, and not to limit possible implementations of the description herein.

Turning to the signal classification system 102 in more detail, it may be implemented in software, hardware, or any combination thereof. The signal classification systems 102 may include one or more processors (not shown), which may have a particular type or architecture, chosen as appropriate for particular implementations. The processors may couple to one or more bus systems (not shown) that are chosen for compatibility with the processors.

The signal classification systems 102 may include one or more instances of computer-readable storage media 108, which couple to the bus systems. The bus systems may enable the processors to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

In implementations that include software, the storage media 108 may include one or more modules of instructions that, when loaded into the processor and executed, cause the signal classification systems 102 to perform any of the functions or processes described herein. These modules may implement the various algorithms and process flows described and illustrated herein. The storage media 108 may also provide storage for any number of data structures or registers used in connection with the signal classification techniques described herein.

As represented generally at 110, the signal classification systems 102 may also include components that are implemented in hardware, which generally represents any gates, logic, integrated circuit chips, processors, storage elements, or other hardware elements chosen to implement the signal classification systems as described herein. In addition, the signal classification systems may also include elements that perform optical processing, as also represented at 110.

Turning to the signal classification system 102 in more detail, the signal classification system 102 may include a training stage 112 and a classifying stage 114. The training stage 112 generally represents any hardware and/or software operative to receive any number of training signals 116*a* and 116*n* (collectively, training signals 116). The term "signal", as used herein, refers to any physical quantity that varies with some other quantity, usually in terms of time or space, or both. Examples include, but are not limited to, the following:

Sounds and vibrations produced by man-made and natural sources, in air, water, earth, or other media. Examples may include human speech, seismic waves, or the like;

Electrical signals, such as those found in electronic circuits, and electromagnetic waves, such as man-made radio waves, or those from extraterrestrial sources;

Images from photographic or optical systems, or a sequence of such images, such as video.

Signals may be converted to a mechanical displacement, electrical signal, optical signal, a numerical value, or some combination of these, as the signal is processed. For example, a speech signal, characterized by a wave of compressed and rarefied air molecules, may be converted to a mechanical vibration of a diaphragm in a microphone. Next, the mechanical vibration may be converted to an electrical signal by a piezoelectric device, and finally, via electronic amplifiers and analog-to-digital converters, to a sequence of numerical values.

Different instances of the training signals 116 may be associated with known classifications or classes of signals, with examples of such classes shown at 118*a* and 118*n* (collectively, signal classes 118). For clarity of illustration only, FIG. 1 illustrates an example including two sets of training signals 116 and corresponding classes 118. However, implementations of this description may include any number of training signals 116 and corresponding classes 118.

As detailed further throughout this description, the term "class" or "classes" of signals refers to a set of signals that have some common attribute. For example, the set of all speech signals including the word "the" as spoken by a large number of individuals could be considered a single signal class. The same group of individuals speaking the word "cat" may generate a set of signals belonging to a different class. Likewise, a set of images of flowers may be one signal class, whereas a set of images of leaves could be another signal class. In some cases, particular classes of signals may relate to the nature of the signal source. For example, all the ways that a given speaker says the word "the" could be one signal class, and all the ways that another speaker says the same word "the" could be another signal class.

In general, the training signals 116 are "known", in the sense that they are associated with known classes 118. The training stage 112 processes these training signals to create a system used in the classifying stage 114 to classify input signals 120, whose classes are unknown. More specifically, the training stage 112 may process the training signals 116 in response to classification parameters 122 provided by one or more users 124. The classification parameters 122 may specify particular characteristics of the training signals 116 to be calculated by the training stage, as reflected in the computed signal parameters 126.

The signal parameters 126 may include sequences of values that capture characteristics or information about the training signals 116. The selection of the specific signal parameters to be computed from the training signals depends upon the character of the training signals themselves, and the nature of the classes to which the training signals belong. In general, one goal of the classification parameters 122 is to compute signal parameters 126 that separate the signal classes 118 in a vector space, as described in further detail below. For example, in an example implementation, the training signals 116 and the input signals 120 may be speech signals. In this example, the signal parameters 126 may cause the training stage 112 to compute the Mel-frequency cepstral coefficients (MFCC) of the training signals 116 for later use in classifying the input signals 120.

In another example, the training signals 116 and input signals 120 may be radio-frequency (RF) signals. In this example, the classification parameters 122 may cause the training stage 112 to compute, as the signal parameters 126, the carrier frequency, bandwidth, time duration, and/or other characteristics of the radio signals.

In some cases, the signal may include a relatively small quantity of numerical values. In such cases, these numerical values themselves could be employed as the signal parameters 126.

In general, whatever the nature of the training and input signals, the training stage 112 may compute or derive any number of signal parameters 126 from training signals 116. In turn, the classifying stage 114 may use the computed or derived signal parameters 126 to classify the input signals 120.

As shown in FIG. 1, particular instances of the computed signal parameters 126 may be associated with respective classes, as denoted at 128. For example, continuing one of the examples introduced previously, a first set of training signals 116*a* may represent a given speaker saying the word "the", as associated with the class 118*a*. The training signals 116*n* may represent another given speaker saying the same word "the", as associated with the class 118*n*. In this example, the training stage 112 may compute a first set of signal parameters 126 for the training signals 116*a*, and may define a first instance of the class 128 to associate this first set of signal parameters with the class 118*a*. Next, the training stage 112 may compute another set of signal parameters 126 for the training signals 116*n*, and may define another instance of the class 128 to associate this next set of signal parameters with the class 118*n*.

Storage elements 130 may receive the computed signal parameters 126 and associated class representations 128 from the training stage 112, and may store these parameters and classes for retrieval by the classifying stage 114. The storage elements 130 may take any convenient form as appropriate in different implementations, including any number of registers, memories, or other hardware storage elements in hardware implementations. In software implementations, the storage elements 130 may include data structures, databases, or the like.

Referring to the classifying stage 114, as described further below, it may receive the input signals 120, and compute or derive signal parameters from these input signals. More specifically, the classifying stage 114 may compute instances of the signal parameters 126 as specified by the classification parameters 122. The classifying stage 114 may then compare the signal parameters 126 computed for the input signals 120 to the signal parameters 126 that were computed previously for the different instances of the training signals 116. In this manner, the classifying stage 114 may attempt to analogize the input signals 120 to the training signals 116, using the signal parameters 126 computed for both of these signals.

If the classifying stage 114 determines that the input signal 120 is sufficiently similar to one or more of the training signals 116, as indicated by the signal parameters computed for both, the classifying stage may generate classification results 132 accordingly. More specifically, these classification results 132 may classify the input signals 120 as being in the same class as the training signals to which the input signals 120 are most similar. Put differently, the classifying stage 114 may retrieve the class 128 of the training signal 116 to which the input signal 120 is most similar, and may assign this class 128 to the input signal 120, as reflected in the classification results 132. In some cases, the classifying stage 114 may update the storage element 130 with a representation of the input signal 120, and the class to which the input signal is assigned.

In some cases, the input signal 120 may not be sufficiently similar to any of the training signals 116 represented in the storage 130. In such cases, the classification results 132 may indicate that the classifying stage 114 was unable to classify the input signals 130.

Having described in FIG. 1 the overall systems or operating environments 100 for classifying signals, the discussion now turns to a description of a visual or graphical representation of relationships between the training signals and the parameters computed or derived for these training signals. This description is now provided with FIG. 2.

Figure 2:
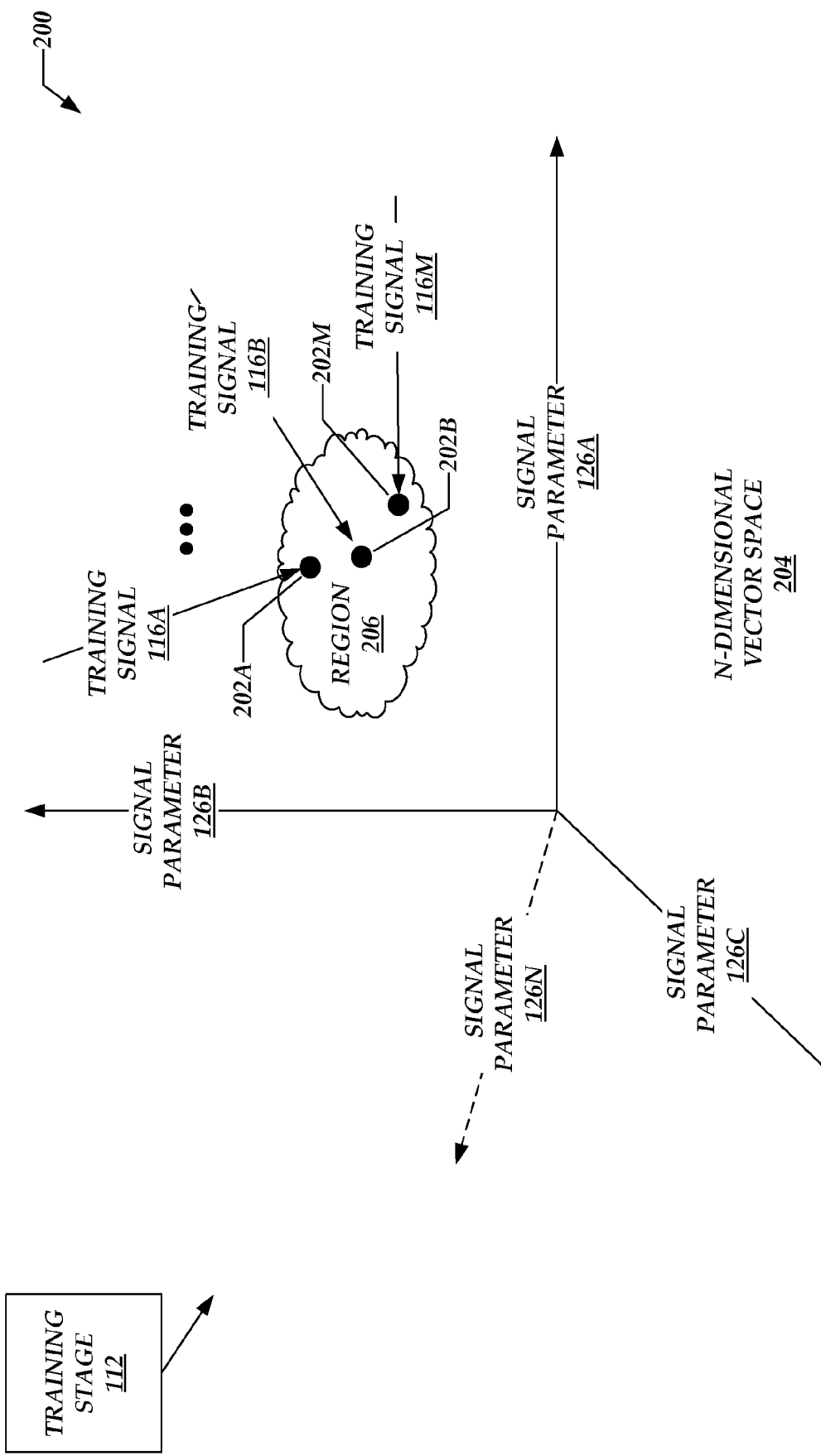
FIG. 2 is a diagram providing a visual or graphical representation between training signals and parameters computed or derived for these training signals.

FIG. 2 provides a visual or graphical representation, denoted generally at 200, between training signals and parameters computed or derived for these training signals. For ease of description, but not to limit possible implementations, FIG. 2 may carry forward some elements from previous drawings, and denote them with identical reference numbers. For example, FIG. 2 elaborates further on the training stage 112, and incorporates representations of various training signals 116, as well as signal parameters 126 computed for these training signals.

Turning to FIG. 2 in more detail, assume that the training stage 112 receives a plurality of training signals that represent the word "the" as spoken by a variety of different speakers. FIG. 2 denotes these example training signals at 116a, 116b, and 116m. In turn, the training stage 112 may compute any number of respective signal parameters for these example training signals 116. Generally, the training stage 112 may compute or derive N respective signal parameters for the training signals 116, with N representing an integer chosen as appropriate for different implementations. If the number of signal parameters computed for each training signal is N, then the signal parameters computed or derived for each training signal may be represented as a vector of length N, which contains N computed or derived signal parameters (symbolized as $P_1, P_2, \ldots, P_N$). In turn, the different training signals 116a, 116b, and 116n may be associated with respective N-length vectors $[P_1, P_2, \ldots, P_N]$, as denoted in FIG. 2 at 202a, 202b, and 202m (collectively, vectors 202).

These different N-length vectors 202 may represent single points in an N-dimensional vector space, with an example vector space denoted in FIG. 2 at 204. As shown graphically in FIG. 2, the process of computing or deriving signal parameters from the various training signals 116 maps the different training signals to corresponding points in the N-dimensional vector space 204. In turn, the training stage 112 may group training signals into sets of signal classes or classifications. As shown in FIG. 2, sets of parameter-derived points representing signals within a class may occupy respective regions 206 in the N-dimensional vector space 204.

As described above, the signal parameters (e.g., 126) may be chosen so that the regions 206 representing different signal classes are separated from one another. The points within these different regions 206 may represent samples from an underlying N-dimensional probability distribution function (PDF) of the signal parameters 126 for the signal class represented in the regions 206.

As shown in FIG. 2, the different signal parameters 126 computed or derived for the training signals 116 may correspond to axes within a coordinate system defining the N-dimensional vector space 204. For example, a first signal parameter 126a may correspond to a first axis, a second signal parameter 126b may correspond to a second axis, a third signal parameter 126c may correspond to a third axis, and an $N^{th}$ signal parameter 126n may correspond to an $N^{th}$ axis.

Having described in FIG. 2 the visual or graphical representation of relationships between the training signals and the parameters computed or derived for the signals, the discussion now turns to a more detailed description of the storage elements 130. This description is now provided with FIG. 3.

Figure 3:
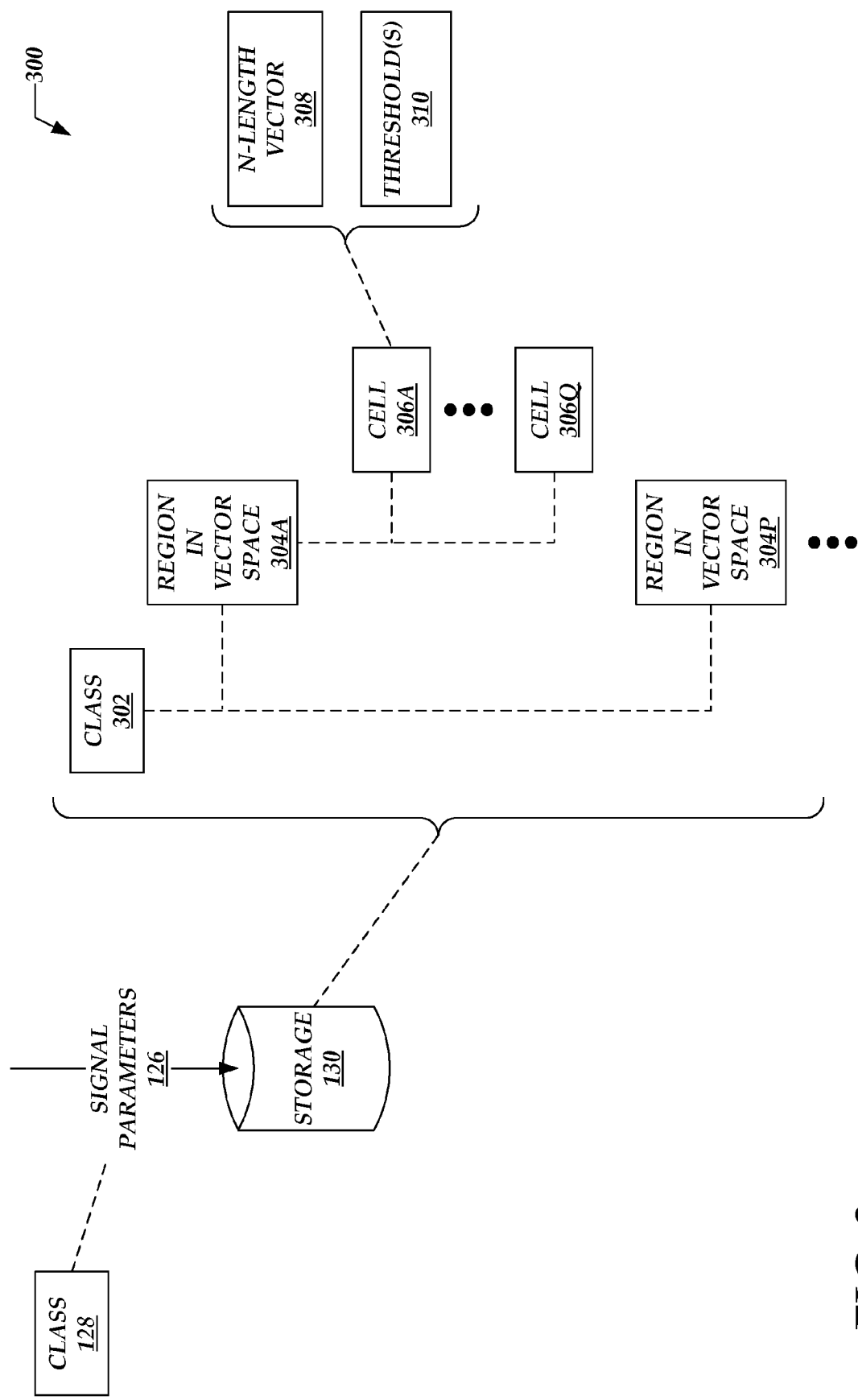
FIG. 3 is a block diagram illustrating data and data structures that may be loaded into storage elements by a training stage of the signal classifiers, and retrieved from the storage elements by a classifying stage of the signal classifiers.

FIG. 3 illustrates additional details, denoted generally at 300, relating to data that may be loaded into storage elements by the training stage (e.g., 112), and retrieved from the storage elements by the classifying stage (e.g., 114). For ease of description, but not to limit possible implementations, FIG. 3 may carry forward some elements from previous drawings, and denote them with identical reference numbers. For example, FIG. 3 elaborates further on the storage elements 130, and incorporates representations of various signal parameters 126 computed for training signals (e.g., 116), as well as associated classes 128.

Turning to the storage elements 130 in more detail, the storage elements 130 may contain representations of one or more classes 302. These class representations 302 may correspond to the classes 128 associated with the incoming signal parameters 126.

Within these class representations 302, the storage elements 130 may represent one or more regions to which these classes are mapped. FIG. 3 provides examples of two region representations at 304a and 304p (collectively, region representations 304). These region representations 304 may correspond to the regions 206 shown graphically in FIG. 2.

Within a given region representation (e.g., 304a), the storage elements 130 may include representations of one or more cells 306a and 306q (collectively, cell representations 306). As described in more detail in subsequent drawings, these cells may represent sub-regions within the regions 206 corresponding to the region representations 304. The description below provides additional details relating to defining and processing the cells represented at 306.

Turning to a given cell representation (e.g., 306a), representations of particular cells may be associated with representations 308 of one or more N-length vectors (e.g., 202 in FIG. 2) that occur within the cell. For example, the training stage 112 may compute or derive signal parameters (e.g., 126 in FIG. 1) for any number of training signals (e.g., 116 in FIG. 1), which in turn may be associated with particular classes (e.g., 128 in FIG. 1). The computer or derived signal parameters 126 may be represented as N-length vectors 202, and associated with particular cells 306. Later, when the classifying stage (e.g., 114 in FIG. 1) processes input signals (e.g., 120 in FIG. 1), the classifying stage may compute or derive the same signal parameters for the input signals 120, define N-length vectors for the input signals 120, and compare these N-length vectors to the N-length vectors 308 loaded into the storage elements 130.

In addition, the cell representations (e.g., 306a) may include representations of thresholds 310 applicable to comparing the N-length vectors, corresponding to the training signals, to the N-length vectors that were computed for the input signals 120 processed by the classifying stage 114. Put differently, the thresholds 310 may specify how similar the input signals 120 and the training signals are to be, before the classifying stage 114 classifies the input signal with the training signals.

It is noted that the representations of classes, regions, and cells shown in FIG. 3 are provided only for example and for clarity of description. Implementations of the features shown in FIG. 3 may include any number of these classes, regions, and cells, without departing from the scope and spirit of this description. These implementations may also arrange these classes, regions, and cells in different configurations, also without departing from the scope and spirit of this description.

Having described in FIG. 3 the storage elements 130, the discussion now turns to a description of process flows that may be performed by the training stage. This description is now provided with FIG. 4.

Figure 4:
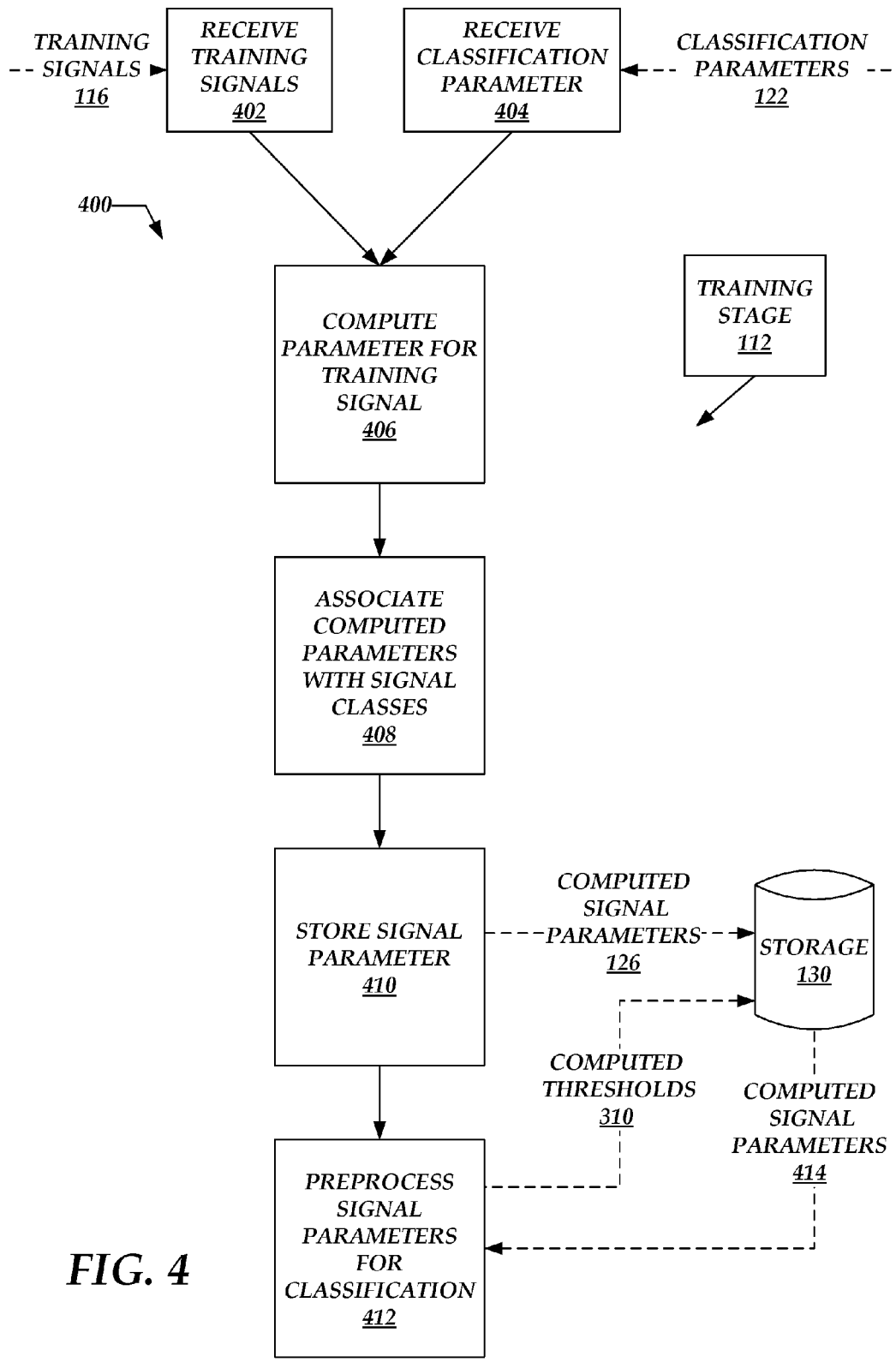
FIG. 4 is a flow chart illustrating techniques for processing training signals in preparation for classifying input signals.

FIG. 4 illustrates process flow, denoted generally at 400, for processing training signals in preparation for classifying input signals. For ease of description, but not to limit possible implementations, FIG. 4 may carry forward some elements from previous drawings, and denote them with identical reference numbers. For example, FIG. 4 elaborates further on the training stage 112, and incorporates representations of example training signals 116, as well as signal classification parameters 122 applicable to computing or deriving particular characteristics or parameters (e.g., 126) from the training signals 116.

For convenience of description only, FIG. 4 illustrates the process flows 400 in connection with the training stage 112. However, it is noted that implementations of the process flows 400 may perform in environments other than the training stage 112 without departing from the scope and spirit of this description.

Turning to the process flows 400 in more detail, block 402 represents receiving training signals (e.g., 116), and block 404 represents receiving classification parameters (e.g., 122). As described above, the training signals 116 may be known, in the sense that they are associated with particular classes of signals. In turn, block 406 represents computing or deriving signal parameters for the various input training signals, based upon the classification parameters received in block 404.

Block 408 represents associating the signal parameters, computed in block 406 for the different training signals 116, with the classifications in which the training signals were organized. Block 408 may include creating and/or updating the storage elements 130 as shown, for example, in FIG. 3.

Block 410 represents storing the signal parameters (e.g., 126) computed in block 406. For example, assuming that block 406 computes N signal parameters for a given training signal 116, block 410 may include representing these signal parameters as N-length vectors within an N-dimensional vector space (e.g., 204 in FIG. 2). In addition, block 410 may include storing representations of such N-length vectors (e.g., 308 in FIG. 3) in a suitable storage element (e.g., 130).

Figure 5:
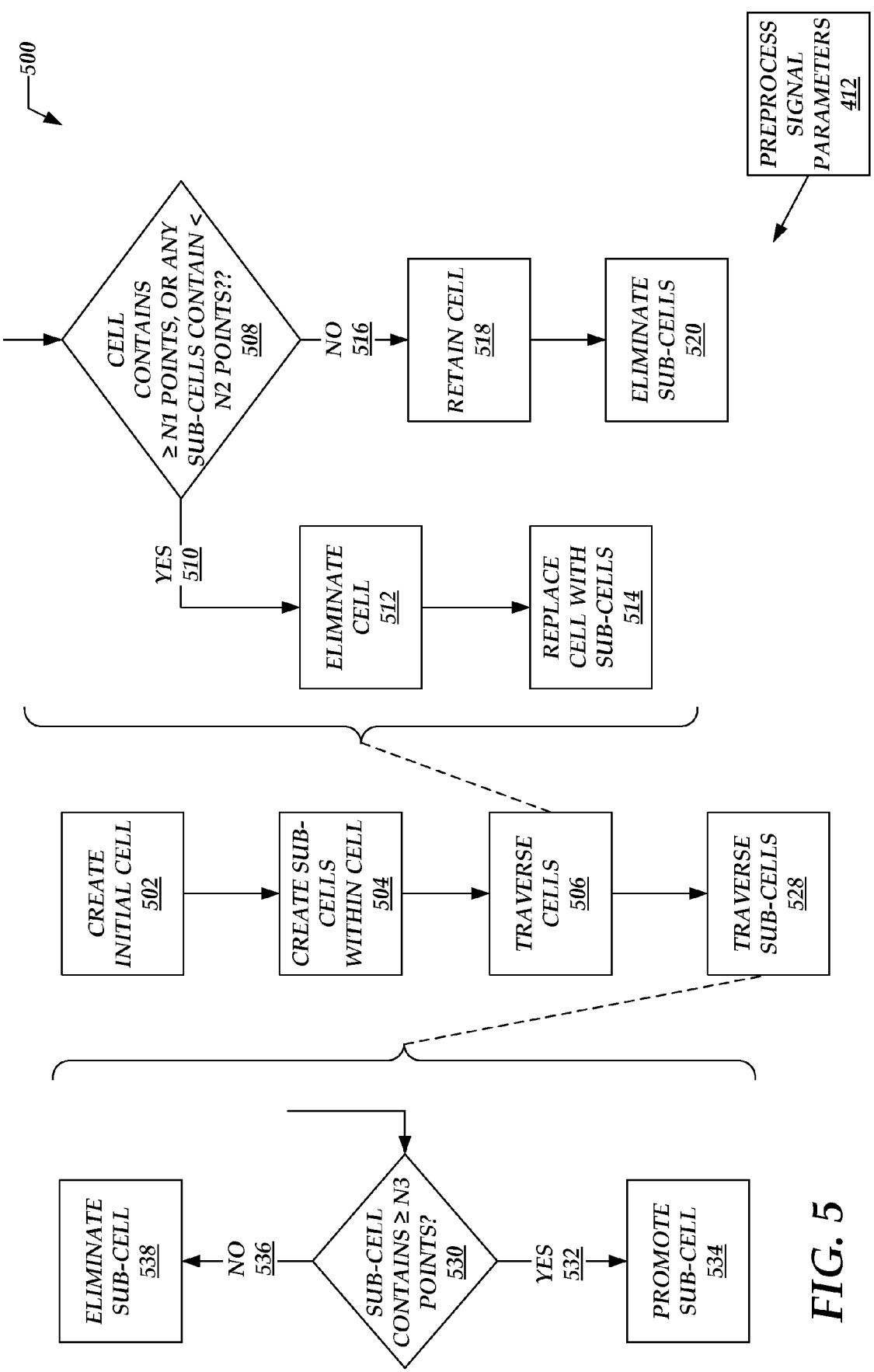
FIG. 5 is a flow chart illustrating techniques for processing signal parameters to enable classification systems to classify input signals.

Block 412 represents preprocessing the signal parameters computed in block 406 to enable the classifying stage (e.g., 114 in FIG. 1) to classify input signals (e.g., 120 in FIG. 1). As used herein, preprocessing may be considered processing. FIG. 4 denotes at 414 examples of signal parameters as input into block 412. As described in further detail in FIG. 5, block 412 may include adapting or tailoring representations of signal classes in N-dimensional vector space (e.g., 204 in FIG. 2) to particular distributions of N-length vectors representing particular training signals within that vector space. As described above, the regions 206 shown in FIG. 2 may represent particular signal classes within the N-dimensional vector space. In such environments, block 412 may enable the process flows 400 to accommodate regions of arbitrary levels of complexity, with these regions assuming a variety of different shapes and characteristics. FIG. 5 elaborates further on block 412, as now described.

Block 412 may also include computing thresholds (e.g., 310 in FIG. 3) that enable the classifying stage to classify input signals. These thresholds may be associated with particular cells or regions within the vector space, as detailed further below with FIG. 13. To facilitate this subsequent processing by the classifying stage, block 412 may include storing the thresholds in the storage elements 130, as shown in FIG. 4.

FIG. 5 illustrates process flows, denoted generally at 500, relating to preprocessing signal parameters to enable classification systems to classify input signals. Without limiting possible implementations, the process flows 500 are described as elaborating further on block 412 shown in FIG. 4. In addition, the process flows 500 are described in connection with the diagrams shown in FIGS. 6-11. These diagrams illustrate how distributions of the signal parameters may be represented initially in cells, and how to process flows 500 may create cells and sub-cells as appropriate to accommodate different distributions of the signal parameters.

Figure 6:
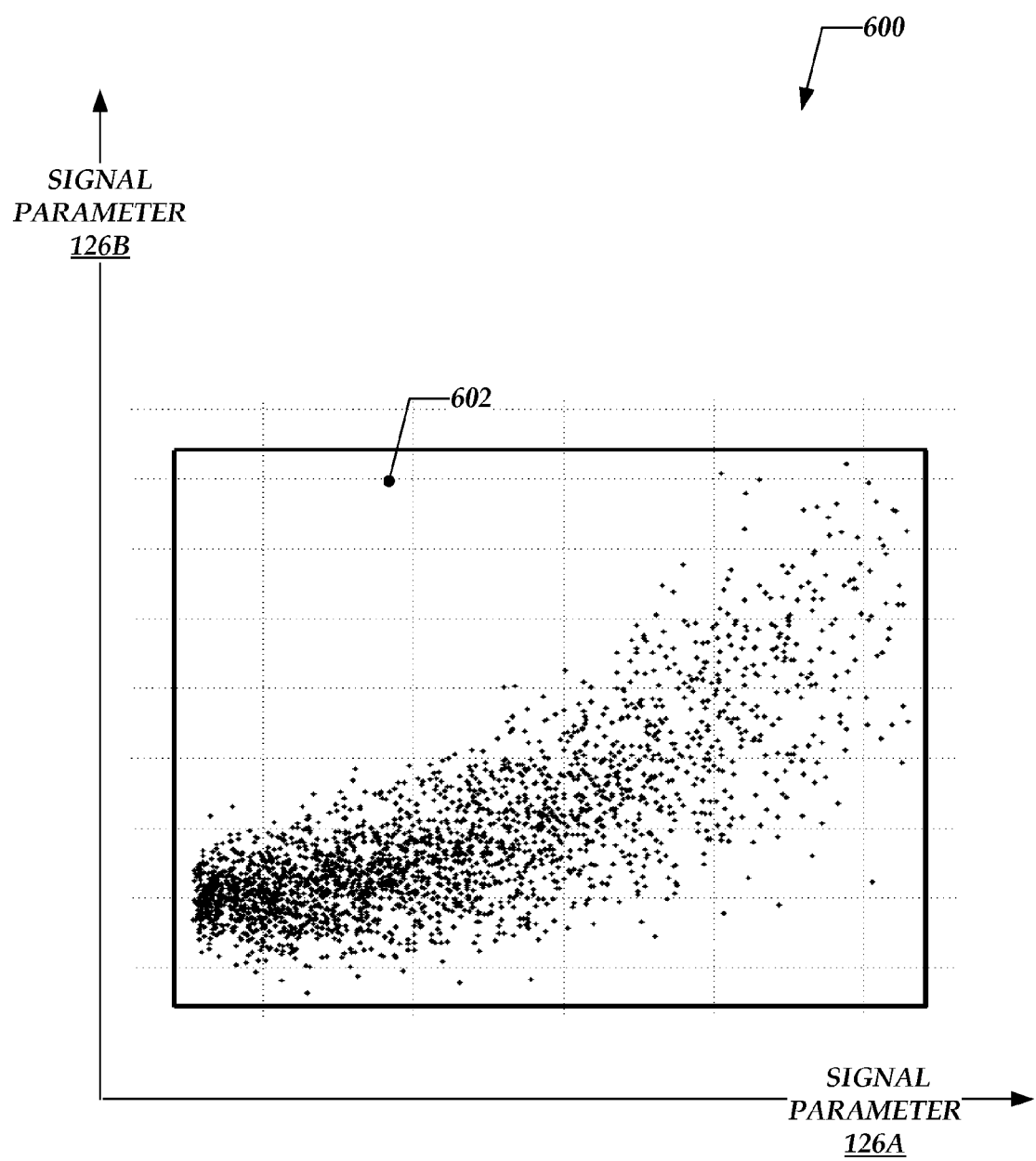
FIGS. 6-11 are diagrams illustrating distributions of signal points representing training signals, as well as processes for constructing cells to incorporate these signal points.

Referring to FIG. 6, because of the difficulty in visualizing multiple dimensions, FIGS. 6-11 illustrate two dimensions, representing a first signal parameter 126a corresponding to a first axis, and a second signal parameter 126b corresponding to a second axis. Thus, FIGS. 6-11 present relatively simplified scenarios in which the training stage computes or derives two parameters for the training signals. In these simplified scenarios, the integer N referenced above equals two (2), with the N-length vectors having length 2. However, it is appreciated that these scenarios may be generalized to an arbitrary number of dimensions.

Turning to the process flows 500 in more detail, and referring to both FIGS. 5 and 6, block 502 represents creating an initial cell that incorporates or includes all of the N-length vectors computed for a given set of training signals to be included in a given class. FIG. 6 provides an example of this initial cell at 602.

In FIG. 5, block 504 represents creating sub-cells within each of the cells existing at a given time. More specifically, block 504 may include creating sub-cells by bisecting each currently-existing cell in each dimension. In this manner, block 504 may create 2*N sub-cells for each cell, where N represents the number of signal parameters computed for each training signal.

Figure 7:
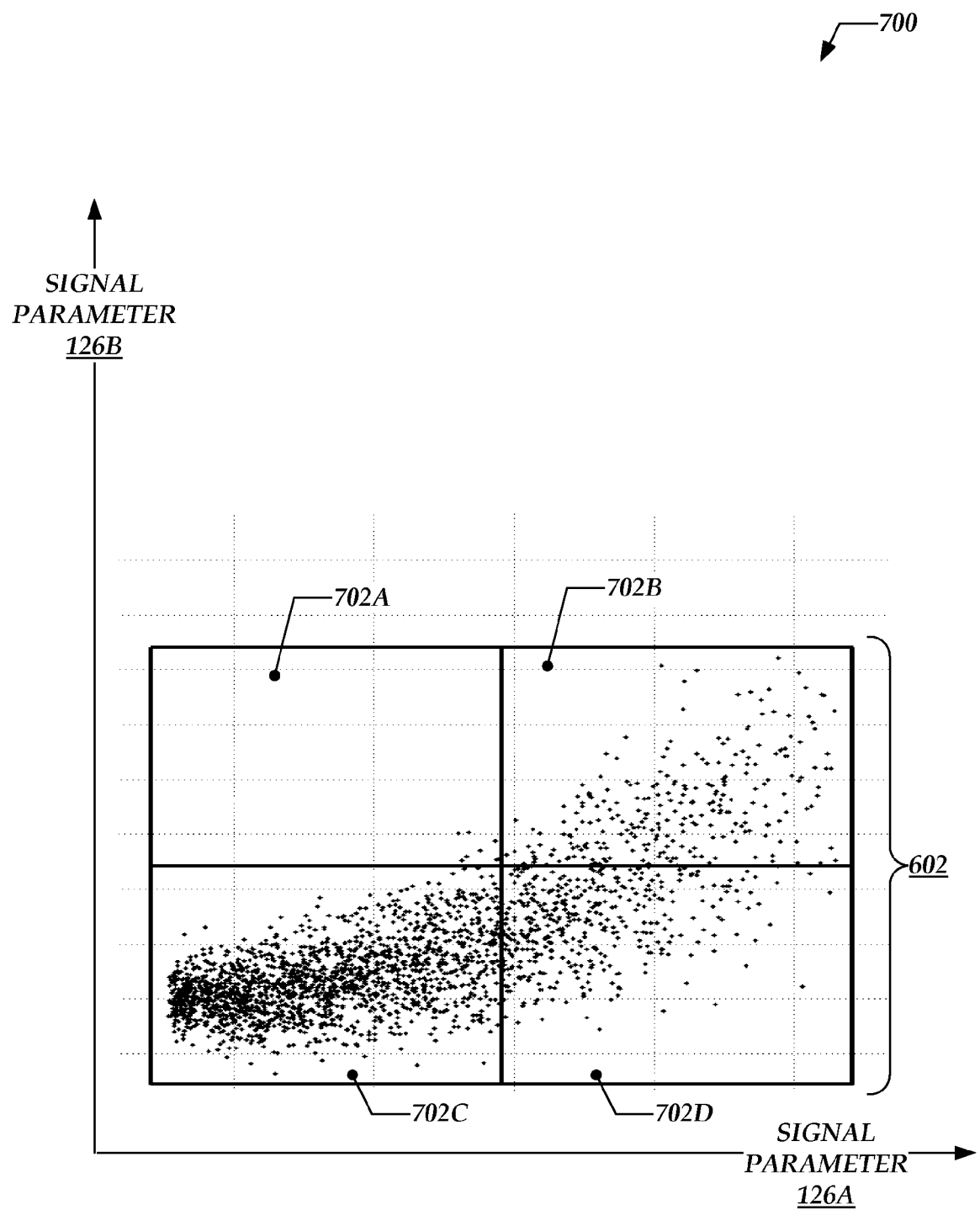

In the example shown in FIGS. 6-11, N is chosen to be two (2). Turning briefly to FIG. 7, block 504 may include creating from the initial cell 602 four sub-cells, denoted respectively at 702a, 702b, 702c, and 702d (collectively, sub-cells 702).

In FIG. 5, block 506 represents traversing each of the cells existing at a given time, and analyzing each of these cells. Referring to FIG. 5 and FIG. 6, block 506 may include selecting the cell 602 for analysis. Decision block 508 in FIG. 5 represents evaluating whether the cell contains at least N1 signal points, with N1 representing a constant chosen as appropriate for different applications. For the purposes of describing FIGS. 5-11, the constant N1 is chosen as 200. However, it is noted that implementations may adjust the constant N1 iteratively as appropriate in different applications, and these values of N1 may differ from the examples provided herein without departing from the scope and spirit of this description.

The dots shown in FIGS. 6-11 represent signal points or vectors corresponding to training signals. As shown in FIG. 6 for example, all of these dots fall inside the initial cell 602. Therefore, from the decision block 508 shown in FIG. 5, the process flows 500 may take Yes branch 510 to block 512, which represents eliminating the cell from further analysis. In turn, the process flows 500 may proceed to block 514, which represents replacing the eliminated cell with its constituent sub-cells.

Continuing the ongoing example, decision block 508 would represent determining whether the cell 602 (shown in FIG. 6) contains at least two hundred (N1=200) signal points. Assuming that the cell 602 contains 200 or more signal points, block 512 would include eliminating the cell 602 from further analysis. In turn, block 514 would include replacing the eliminated cell 602 with its constituent sub-cells 702a-702d, as shown in FIG. 7.

Returning to the decision block 508 shown in FIG. 5, if this decision block results in a negative determination, the process flows 500 may take No branch 516 to block 518, which represents retaining the current cell. In turn, block 520 represents eliminating the constituent sub-cells of the retained cell.

Continuing the ongoing example, if the cell 602 does not contain at least two hundred (N1=200) signal points, then block 518 would retain the cell 602. In turn, block 520 would eliminate the sub-cells 702a-702d shown in FIG. 7.

Returning to FIG. 5, decision block 508 represents evaluating whether any of the sub-cells within the current cell contains fewer than N2 signal points, where N2 represents a constant chosen as appropriate in different applications. For the purposes of describing the ongoing example, the constant N2 is chosen to be three (3). However, it is noted that this constant N2 may assume values other than three (3) in possible implementations, without departing from the scope and spirit of the present discussion.

Referring briefly to FIG. 7, decision block 508 may examine each of the sub-cells 702a-702d, and determine whether any of these sub-cells contain fewer than three (3) signal points. If any of these sub-cells 702a-702d contains fewer than three (3) signal points, the process flows 500 may take Yes branch 510 to blocks 512 and 514, which respectively represent eliminating the cell, and replacing the cell with its constituent sub-cells.

Returning to decision block 508, if none of the sub-cells within the current cell contain less than three (3) signal points, the process flows 500 may take No branch 516 to blocks 518 and 520. As described above, these blocks respectively represent retaining the cell, and eliminating its constituent sub-cells from further analysis.

In the example shown in FIG. 5, the decision block 508 and 530 may operate in parallel to perform an alternative test on a given cell and its constituent sub-cells. Put differently, the process flows 500 may reach blocks 512 and 514 if either decision block 508 or decision block 530 result in a Yes output. Otherwise, the process flows 500 may proceed to blocks 518 and 520.

Having elaborated on block 506, which represents traversing each cell currently existing at a given time, the description proceeds to block 528, which represents traversing each of the sub-cells that result from block 506. As shown in FIG. 5, block 528 may include performing decision block 530, which represents determining whether a given sub-cell contains at least N3 signal points, with N3 representing a constant chosen as appropriate for different applications. For the purposes of describing the ongoing example, but not to limit possible implementations, the constant N3 is chosen as three (3).

From decision block 530, continuing the ongoing example, if a given sub-cell contains three or more signal points, then the process flows 500 may take Yes branch 532 to block 534. Block 534 represents promoting the given sub-cell to a cell. Returning to decision block 530, if the given sub-cell does not contain at least three signal points, the process flows 500 may take No branch 536 to block 538, which represents eliminating the sub-cell from further processing.

Continuing the ongoing example shown generally at 700 in FIG. 7, block 528 may include traversing and evaluating each of the sub-cells 702a-702d, using decision block 530. In this example, assuming that each of these sub-cells 702a-702d contain at least three signal points, block 534 would promote each of these sub-cells to cells.

Having completed a given iteration through blocks 504, 506, and 528, the process flows 500 may evaluate whether a predefined cell size has been reached for all of the cells. If so, the process flows 500 may exit without further iterations through blocks 504, 506, and 528. However, if the predefined cell size has not yet been reached, the process flows may return to block 504, and repeat block 504, 506, and 528, until the predefined cell size has been reached.

Figure 8:
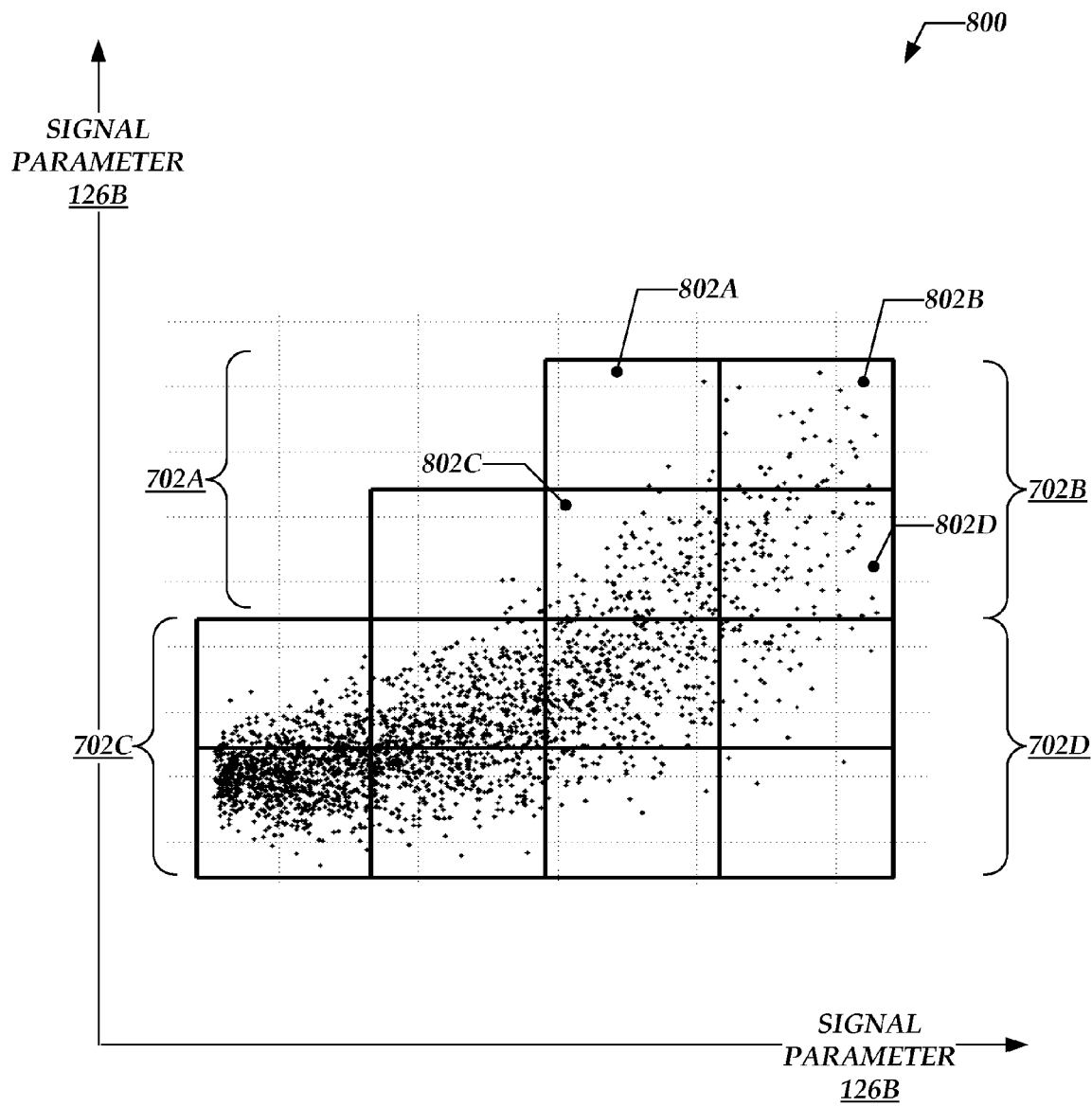

Referring briefly to FIG. 7, assuming that the predefined cell size has not been reached, the recently-promoted cells 702a-702d, then block 504 would create sub-cells out of these cells. Referring now to FIG. 8, illustrating a cell configuration denoted generally at 800, this Figure carries forward representations of the cells 702a-702d to illustrate the transition from FIG. 7 to FIG. 8. For example, referring to the cell 702b, the cell may be divided into the sub-cells 802a, 802b, 802c, and 802d (collectively, sub-cells 802). Likewise, the remaining cells 702a, 702c, and 702d may be divided in similar manner, although FIG. 8 does not reference the sub-cells associated with the cells in the interests of clarity. In turn, blocks 506 and 528 may analyze and process the various sub-cells shown in FIG. 8 (e.g., sub-cells 802).

Figure 9:
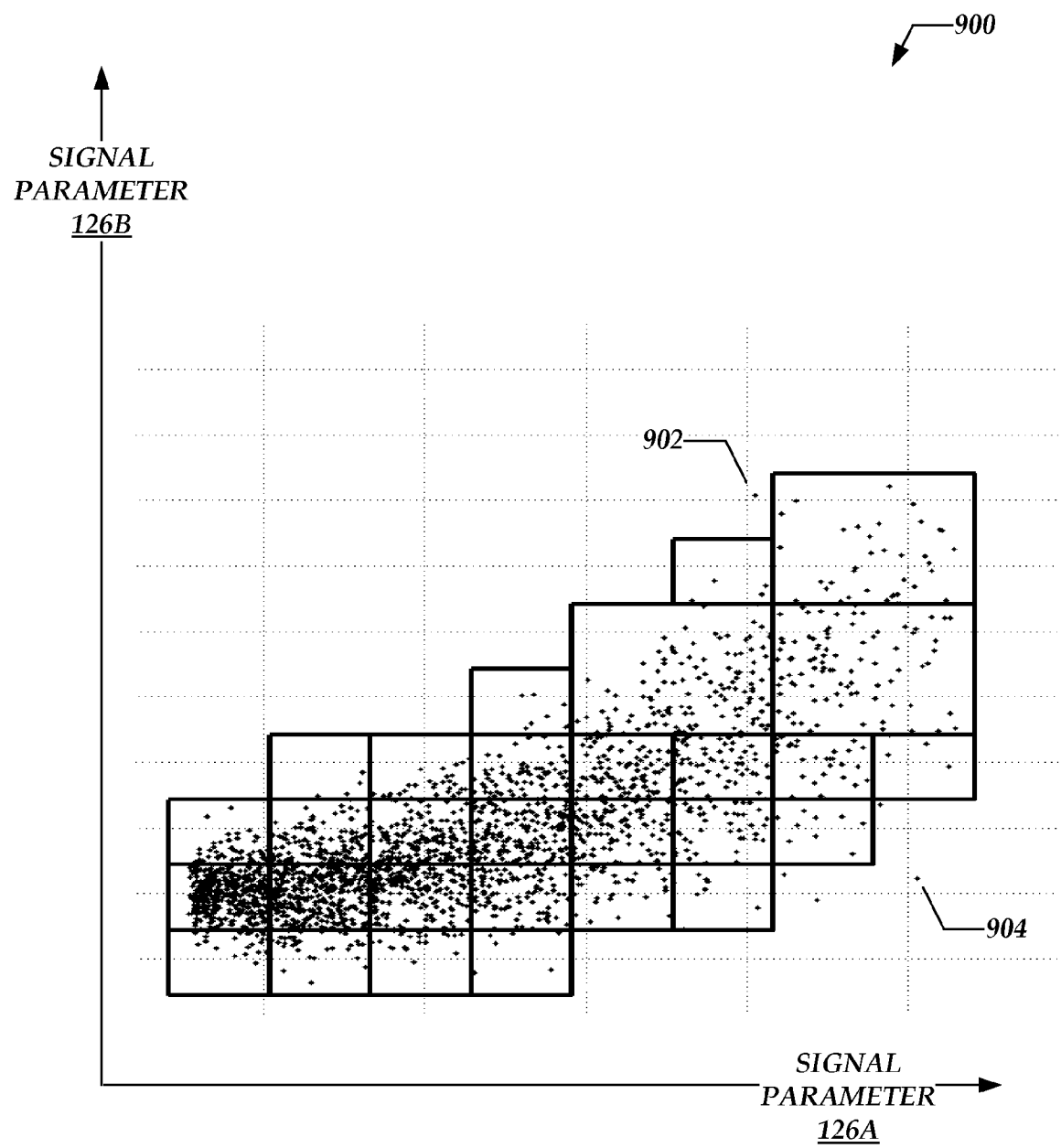

After another iteration of blocks 504, 506, and 528, the cell configuration as shown in FIG. 8 may transition to the configuration shown generally at 900 in FIG. 9. In the configuration 900, the process flows 500 begin to create cells of different sizes, in response to the varying distribution of the signal points across and within different cells. In addition, FIG. 9 provides examples of signal points 902 and 904, which are "outliers" that fall outside of the cells.

Figure 10:
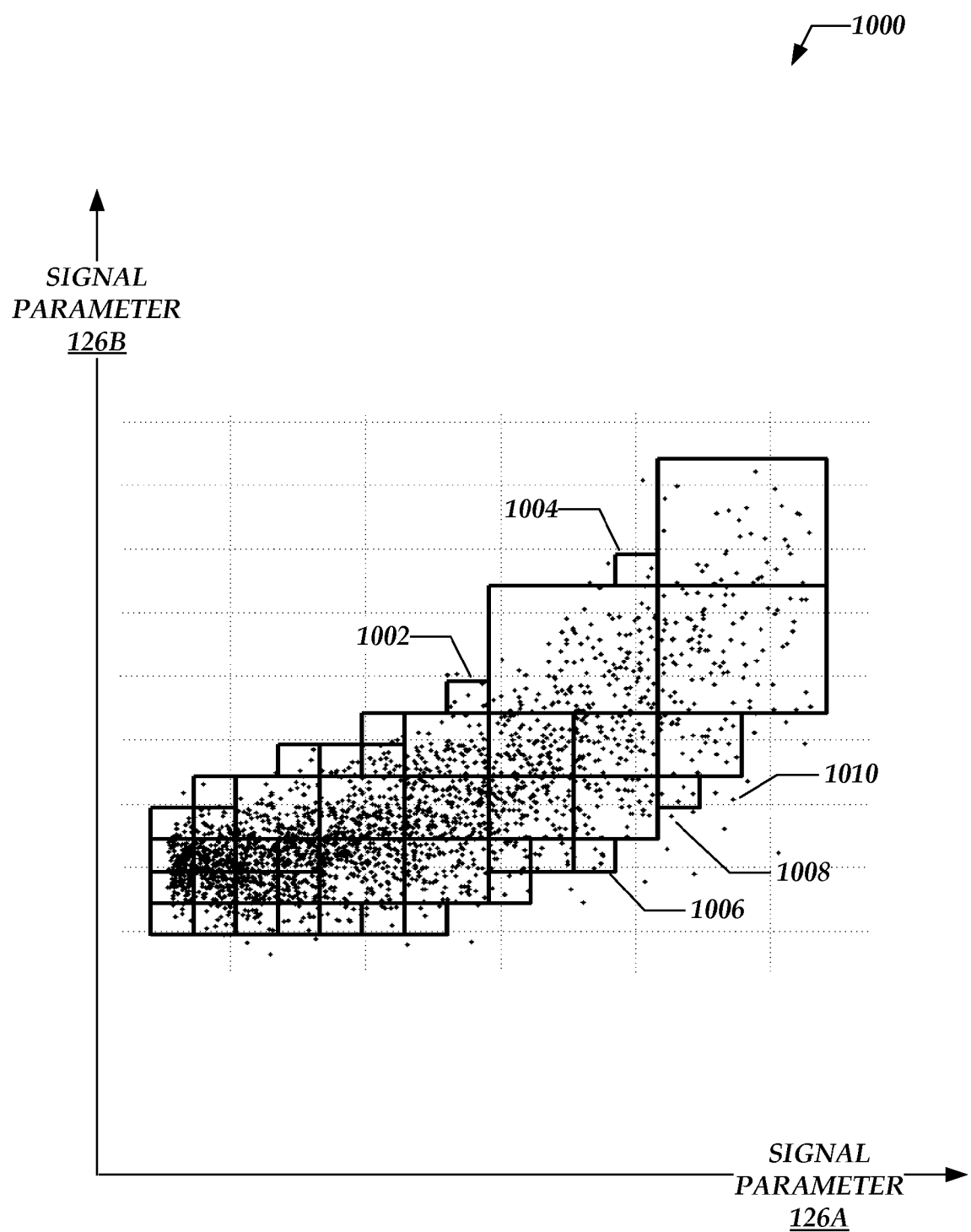

Another iteration of the process flows 500 transitions to the configuration 1000 shown in FIG. 10. As shown in FIG. 10, cells 1002, 1004, and 1006 become smaller, as compared to their counterpart cells as shown in FIG. 9. As these cells become smaller with more iterations of the process flows 500, more signal points fall outside the cells and become outliers (e.g., cells 1008, 1010, and others).

Figure 11:
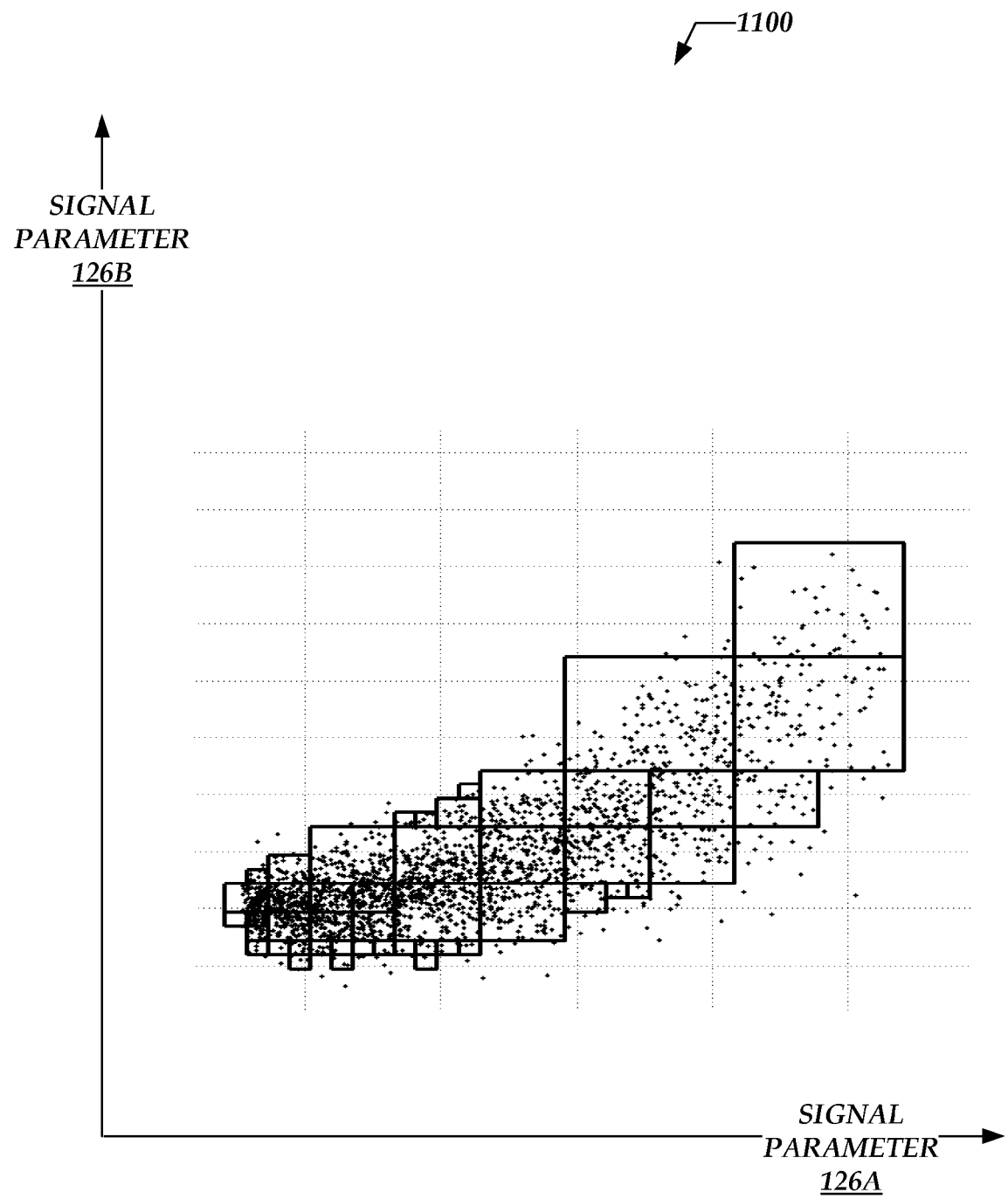

Another iteration of the process flows 500 transitions to the configuration 1100 shown in FIG. 11, after which the application-dependent cell size is assumed to be reached, thereby terminating the process flows 500.

Having described the various components, data structures, process flows, and example cell configurations in FIGS. 1-11, the discussion now proceeds to a more detailed description of the classifying stage 114. This description now begins with FIG. 12.

Figure 12:
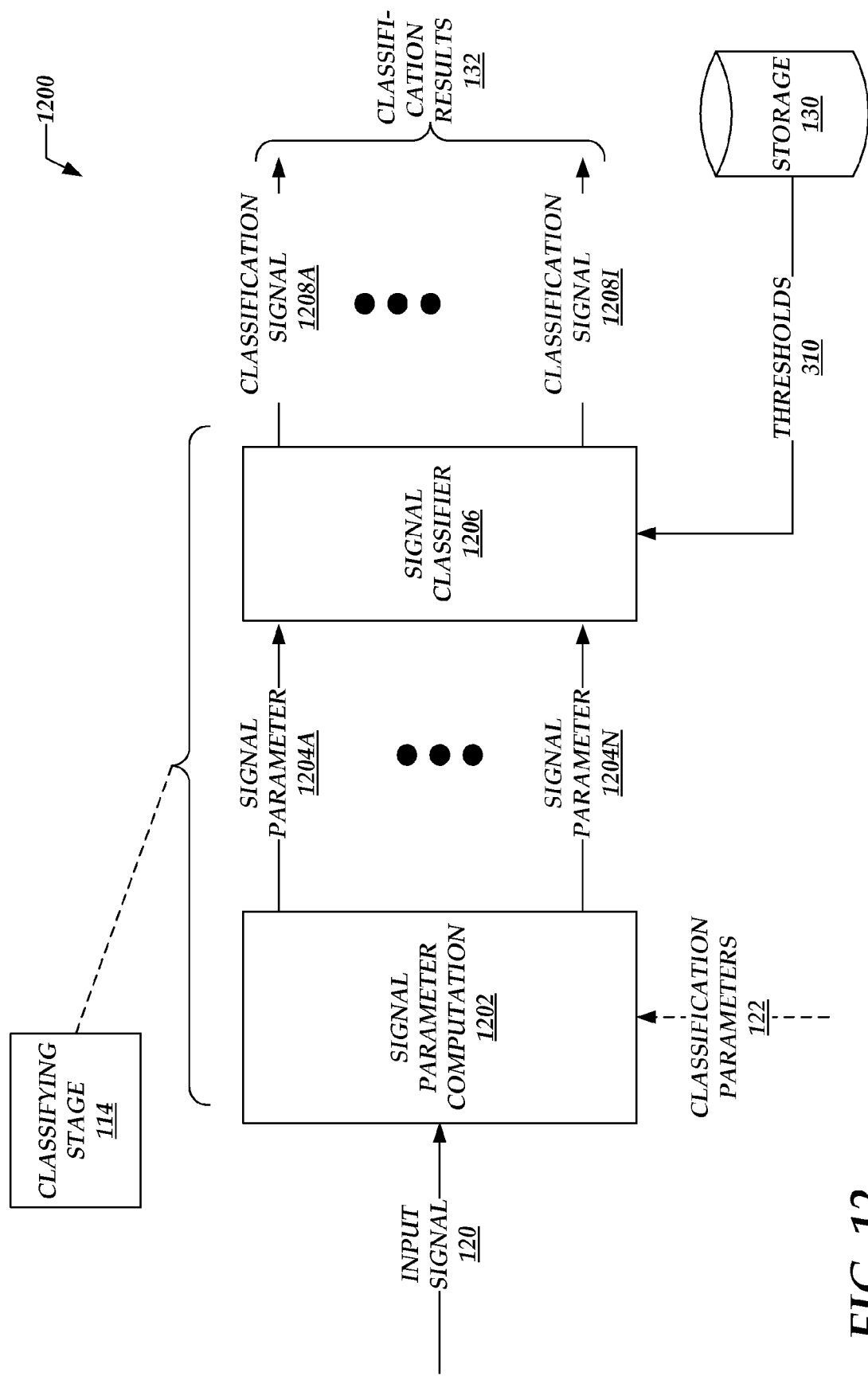
FIG. 12 is a combined block and flow diagram illustrating additional aspects of the classifying stage of the signal classifier.

FIG. 12 illustrates additional aspects, denoted generally at 1200, relating to the classifying stage introduced previously. For ease of description, but not to limit possible implementations, FIG. 12 may carry forward some elements from previous drawings, and denote them with identical reference numbers. For example, FIG. 12 elaborates further on the classifying stage 114, and incorporates representations of various input signals 120 for classification, as well as the storage elements 130, the classification results 132, and the classification parameters 122.

Turning to FIG. 12 in more detail, the classifying stage 114 may include components 1202 operative to receive the input signal 120 and the classification parameters 122. Recalling from previous description, the classification parameters 122 may specify one or more (generally, N) signal parameters to derive or compute from the training signals 116. However, as shown in FIG. 12, classification parameters 122 may specify N signal parameters to derive or compute from the input signals 120. As detailed further below, because the same classification parameters are derived from the input signals 120 and the training signals 116, these classification parameters may provide a basis for classifying the input signals by comparing them to the training signals.

The signal computation components 1202 may compute or derive parameters from the input signal 120, in response to the classification parameters 122. FIG. 12 provides an example in which the components 1202 compute and output signal parameters 1204a and 1204n (collectively, signal parameters 1204). The signal parameters 1204 may be similar to the signal parameters 126 shown in FIG. 1. However, the signal parameters 1204 may be computed from the input signal 120, rather than the training signals 116.

The classifying stage 114 may also include signal classifier components 1206 that are operative to receive the signal parameters 1204, and to compare the signal parameters to the signal parameters 126 derived from the training signals 116 (both of which are shown in FIG. 1). For example, the signal classifier components 1206 may retrieve thresholds (e.g., 310) from the storage elements 130. These thresholds 310 were computed previously from the signal parameters 126, which in turn were previously computed for the training signals 116 and loaded into the storage elements 130.

Depending on whether the signal parameters 1204 are sufficiently similar to any of the signal parameters 126 computed for the training signals, the signal classifier 1206 may generate classification results 132. The classification results 132 may indicate which, if any, signal classes the input signal 120 may belong. In some cases, the classification results 132 may indicate that the input signal 120 does not fit into any of the predefined classes recognized by the signal classifier 1206.

As shown in FIG. 12, the classification results 132 may include any number of classification signals 1208a and 1208i (collectively, classification signals 1208). In some implementations, the classification signals 1208 may correspond respectively to a set of predefined signal classes. For example, these classes may be the known classes associated with the training signals 116. In such scenarios, the classification signals 1208 may be binary signals that are activated when the input signal 120 is to be classified in the class corresponding to the active binary signal. In some cases, the input signal 120 may not fall into any of the predefined classes, as may be indicated by none of the classification signals 1208 going active for the input signal.

Having described the classifying stage 114 in more detail in FIG. 12, the discussion now proceeds to a description of threshold processing elements and related thresholds, which the signal classifier 1206 may use to compare the signal parameters 1204 to the signal parameters 126. This description is now provided with FIG. 13.

Figure 13:
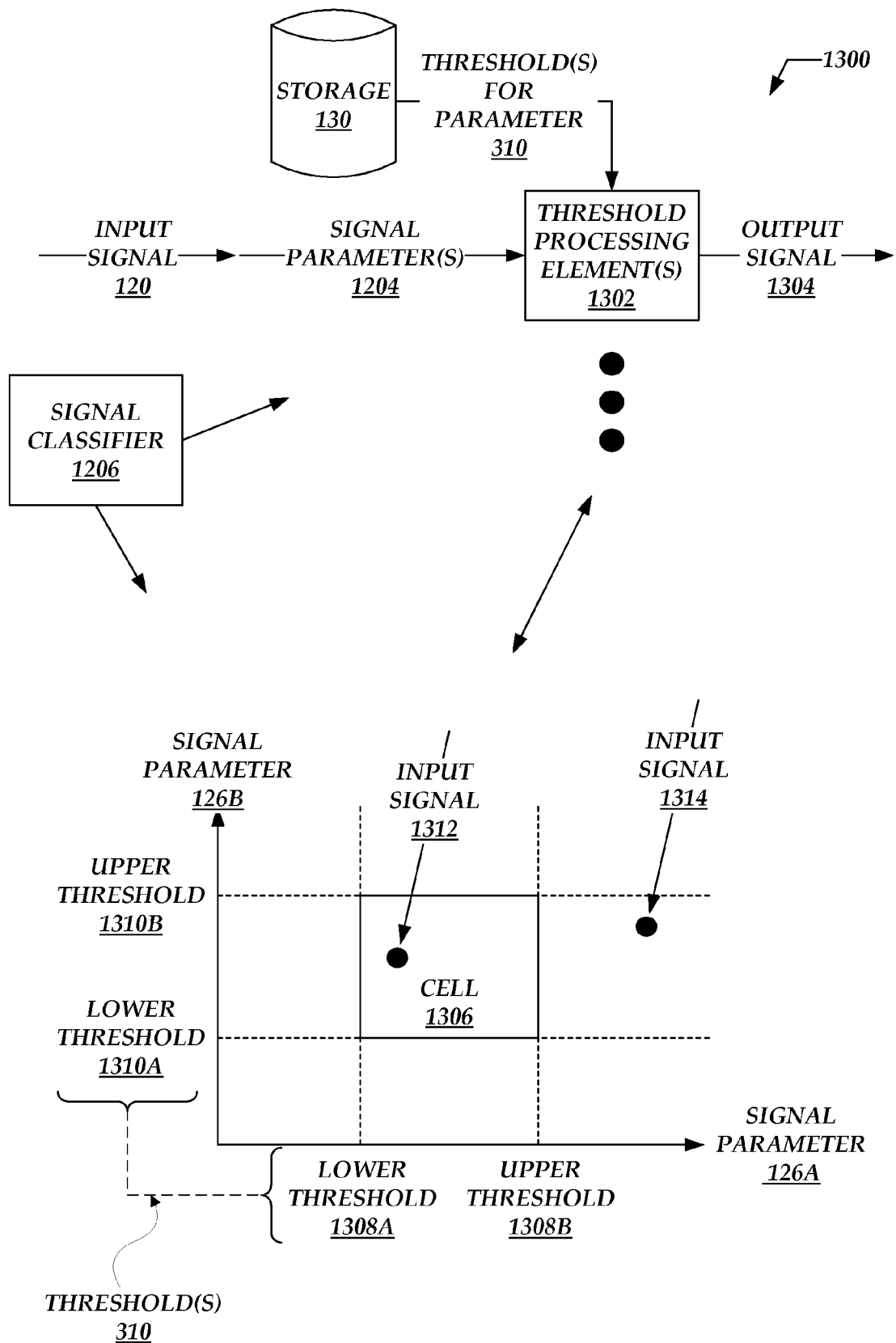
FIG. 13 is a combined block and flow diagram illustrating threshold processing elements and related thresholds.

FIG. 13 illustrates threshold processing elements and related thresholds, denoted generally at 1300. For ease of description, but not to limit possible implementations, FIG. 13 may carry forward some elements from previous drawings, and denote them with identical reference numbers. For example, FIG. 13 elaborates further on the signal classifier 1206, and incorporates representations of an input signal 120 to be classified, from which one or more signal parameters 1204 are calculated or derived. FIG. 13 also carries forward the storage elements 130, which may contain specified thresholds 310 applicable to different cells. As described above in FIG. 3, these thresholds and cells may organize the signal parameters 126a and 126b calculated previously for training signals (e.g., 126 in FIG. 1).

Referring to the upper portion of FIG. 13, the signal classifier 1206 may include one or more threshold processing elements 1302, which are operative to receive the signal parameters 1204 computed for a given input signal 120. The threshold processing elements 1302 may also receive representations of the thresholds 310 specified for a variety of cells. The cells may contain one or more signal parameters computed for training signals by the training stage (e.g., 112 in FIG. 1). FIGS. 6-11 illustrate processes for defining and modifying cells to incorporate various distributions of signal points calculated for training signals. The threshold processing elements 1302 may generate output signals 1304 indicating whether the input signal parameter 1204 falls within the thresholds specified for the cells defined within the storage elements 130.

The lower portion of FIG. 13 illustrates graphically how the threshold processing elements 1302 may operate. For ease of illustration, but not to limit implementations, this portion of FIG. 13 depicts signal parameters 126a and 126b as two axes of a two-dimensional graph. FIG. 13 also illustrates an example cell 1306, which may be any of the cells defined according to the process is illustrated in FIGS. 6-11. The thresholds 310 specified for the cell 1306 may include upper and lower thresholds applicable to the signal parameters 126a and 126b. For the signal parameter 126a, the thresholds 310 may specify a lower threshold 1308a and an upper threshold 1308b (collectively, thresholds 1308). For the signal parameter 126b, the thresholds 310 may specify a lower threshold 1310a and an upper threshold 1310b (collectively, thresholds 1310).

Taken as a group, these upper and lower thresholds 1308 and 1310 may define a "box" corresponding to the cell 1306. Recalling previous discussion, the cell 1306 may be associated with a class of signals, as defined by processing a plurality of training signals. Any input signals 120 whose computed signal parameters 1204 fall within the "box" defined by the upper and lower thresholds 1308 and 1310 may be assigned to the class represented by the cell 1306. FIG. 13 provides an example of such a signal at 1312. In this scenario, the output signal 1304 from the threshold processing element 1302 may reflect that the input signal 1312 falls within the thresholds defined for the cell 1306. Conversely, any input signals whose computed signal parameters 1204 fall outside of this "box" would not be assigned to the class represented by the cell 1306. FIG. 13 provides an example of such an input signal at 1314. In this latter scenario, the output signal 1304 may reflect that the input signal 1314 does not fall within the thresholds defined for the cell 1306.

It is noted that the scenario shown in FIG. 13 is simplified somewhat for convenience and ease of illustration and description. However, it is understood that implementations of this scenario may apply the concepts shown in FIG. 13 in any number of ways, without departing from the scope and spirit of the present description.

In some implementations, the process flows 500 may assign respective relative "weight" values to the cells, so that the cells are described by their 2*N threshold values, and by their one assigned weight value. In some scenarios, the weight value assigned to a given cell may reflect the relative density of signal points occurring within that given cell. This relative density may be computed by dividing the number of signal points contained within in a cell by the volume of the cell. In this case, the weight W may be computed as follows:

$$W = \frac{P}{\prod_{i=1}^{N}(T_{i,upper} - T_{i,lower})},$$

where P is the number of points in the cell, and $T_{i,lower}$ and $T_{i,upper}$ are the upper and lower boundaries for the cell in the $i^{th}$ dimension.

In this way, the collective cells constituting a given signal class region, along with the respective weights of the cells, may approximate the probability density function (PDF) of the signal points for the signal class within the N-dimensional vector space (e.g., 204 in FIG. 2), similarly to how a histogram approximates a single-variable PDF. In the case of a histogram, if the bin widths of the histogram are too wide or too narrow, the histogram may not accurately approximate the single-variable PDF. Similarly, in some applications of the present description, it may be desirable to place bounds on the minimum and maximum sizes allowed for cells, so that the signal regions are more accurately approximated by the cells.

Having described the threshold processing elements and related thresholds, in FIG. 13, the discussion now turns to a description of process flows for classifying input signals. This description is now provided with FIG. 14.

Figure 14:
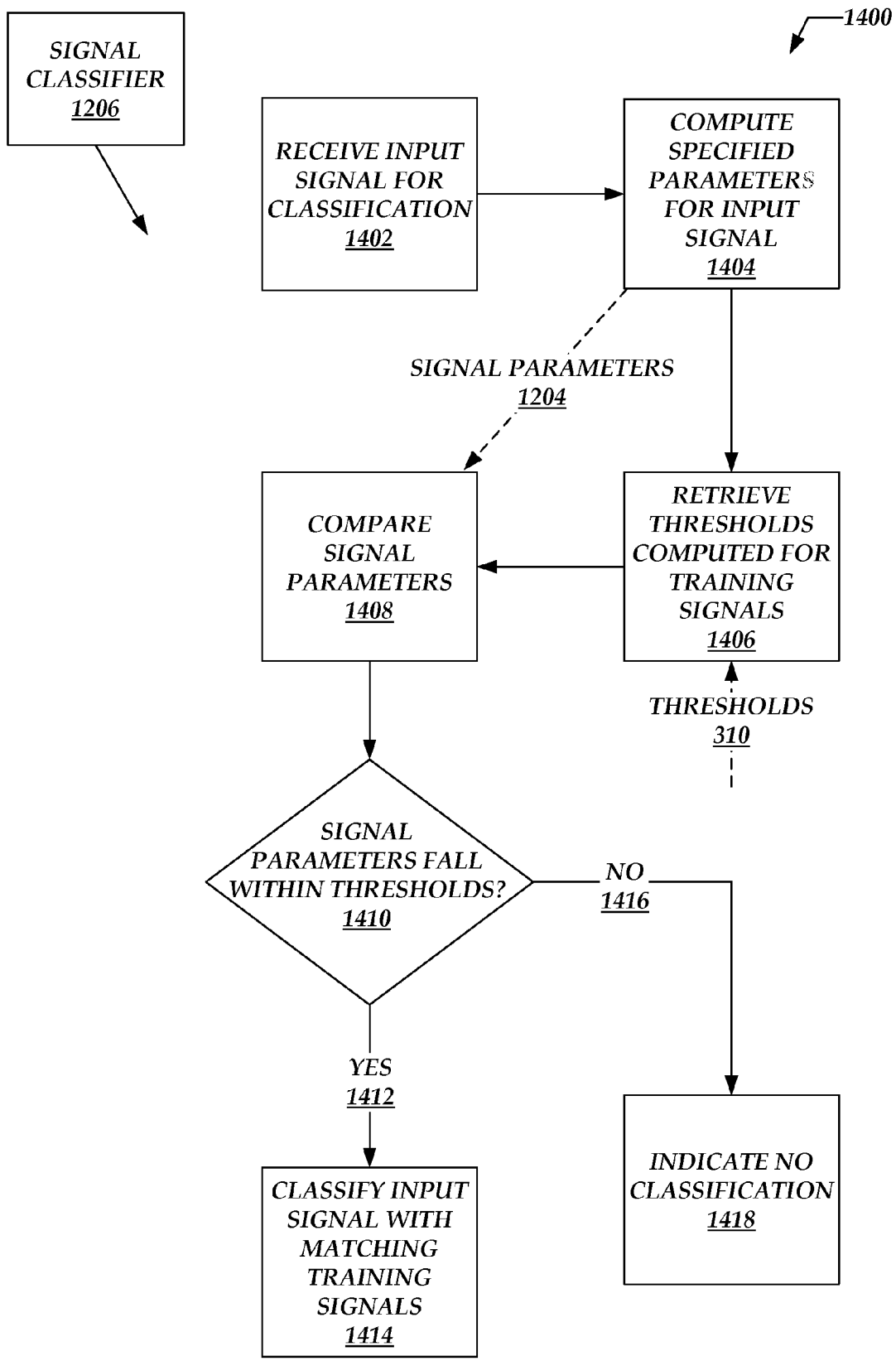
FIG. 14 is a flow chart illustrating processes for classifying input signals.

FIG. 14 illustrates process flows, denoted generally at 1400, for classifying input signals. For ease of description, but not to limit possible implementations, FIG. 14 may carry forward some elements from previous drawings, and denote them with identical reference numbers. For example, FIG. 14 illustrates process flows that the signal classifier 1206 may perform. However, it is noted that implementations of the process flows 1400 may be performed on other components without departing from the scope and spirit of the present description.

Turning to the process flows 1400 in more detail, block 1402 represents receiving an input signal (e.g., 120) for classification. Block 1404 represents computing one or more parameters for the input signal. Block 1404 may include computing classification parameters specified by one or more users. FIG. 12 illustrates examples of such classification parameters 122, and illustrates examples of the computed signal parameters 1204a and 1204n. In some implementations, block 1404 may be performed by the signal parameter computation component 1202 shown in FIG. 12.

Block 1406 represents retrieving one or more thresholds computed previously for a set of training signals. FIG. 14 carries forward examples of these thresholds 310. In some implementations, block 1406 may be performed by the signal classifier 1206 shown in FIG. 12.

Block 1408 represents comparing the signal parameters (e.g., 1204) computed for the input signal in block 1404, with the thresholds computed previously for the training signals. Recalling previous description, storage elements (e.g., 130 shown in FIG. 12) may contain the thresholds computed previously for the training signals. Block 1408 may include traversing the thresholds contained within the storage elements 130, to compare these thresholds to the signal parameter computed for the input signal.

Decision block 1410 represents determining whether any of the thresholds computed for training signals contain the signal parameters computed for the input signal to be classified. Put differently, block 1410 may determine whether the signal parameters 1204 computed for the input signal fall within any of the thresholds 310 defined for the training signals during the training stage. FIG. 13 illustrates the role of thresholds (e.g., 310, 1308, and 1310) and threshold processing elements (e.g., 1302) in making this determination.

From decision block 1410, if the signal parameters computed for the input signal fall within any of the thresholds computed previously for training signals, the process flows 1400 may take Yes branch 1412 to block 1414. Put differently, if the signal parameters computed for a given input signal fall within the thresholds computed for given training signals, the given input signal may be said to approximate the given training signals. Block 1414 represents classifying the input signal with any approximating training signals. As shown in FIG. 13, the output signals 1304 may indicate whether given input signals 120 fall within the thresholds defined for particular cells.

Returning to decision block 1410, if the signal parameters computed for the input signal do not approximate any of the signal parameters computed for training signals, the process flows 1400 may take No branch 1416 to block 1418. Block 1418 represents indicating that the input signal did not fall within the thresholds defined for any cells, and therefore was not assigned to any signal class.

Having described the process flows for classifying input signals in FIG. 13, the discussion now turns to a description of architectures by which multiple threshold processing elements may be combined to test whether a given input signal falls within a given cell. This description is now provided with FIG. 15.

Figure 15:
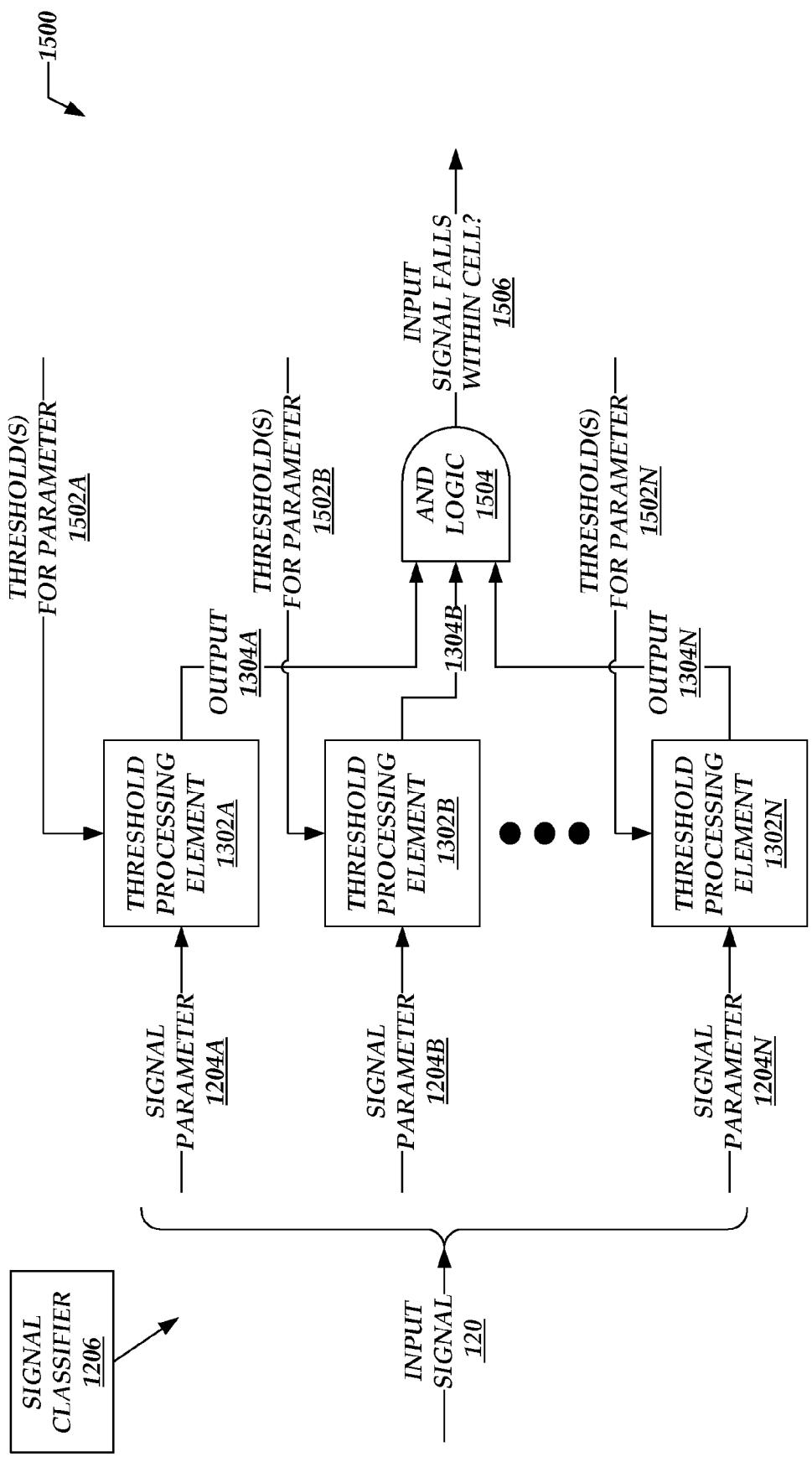
FIG. 15 is a diagram illustrating architectures by which multiple threshold processing components may be combined to test whether a given input signal falls within a given cell.

FIG. 15 illustrates architectures, denoted generally at 1500, by which multiple threshold processing components may be combined to test whether a given input signal falls within a given cell. For ease of description, but not to limit possible implementations, FIG. 15 may carry forward some elements from previous drawings, and denote them with identical reference numbers. For example, FIG. 15 elaborates further on the signal classifier 1206, which classifies various input signals 120.

In turn, signal parameters 1204a, 1204b, and 1204n (collectively, signal parameters 1204) may be computed from the input signal 120, and fed into respective threshold processing elements 1302a, 1302b, and 1302n (collectively, threshold processing elements 1302). The threshold processing elements 1302 may receive respective signals representing thresholds 1502a, 1502b, and 1502n (collectively, thresholds 1502) applicable to the different signal parameters 1204. For example, FIG. 13 illustrates upper and lower thresholds 1308 that apply to the signal parameter 126a, and also illustrates upper and lower thresholds 1310 that apply to the signal parameter 126b.

The various threshold processing elements 1302 may generate respective output signals 1304a, 1304b, and 1304n (collectively, output signals 1304). These output signals may indicate whether different signal parameters 1204 fall within their applicable thresholds 1502. In turn, AND-logic 1504 may receive the output signals 1304, and generate output signals 1506 indicating whether the input signal 120 falls within a given cell. The AND-logic 1504 and threshold processing elements 1302 may be implemented in hardware or software, as appropriate in different application scenarios.

In general, the architectures 1500 shown in FIG. 15 include several components that may operate in parallel. For example, the threshold processing elements 1302 may simultaneously process the signal parameters 1204 against the applicable thresholds 1502. The threshold processing elements 1302 may present their respective output signals 1304 to the AND-logic 1504 at approximately the same time. In a hardware implementation, for example, the AND-logic 1504 may process these output signals 1304 as quickly as permitted by instruction factors, such as gate and signal propagation delays.

For convenience of illustration only, FIG. 15 illustrates three processing elements 1302 for processing three signal parameters 1204. However, the architectures 1500 shown in FIG. 15 may be extended to accommodate N signal parameters 1204 computed for a given input signal 120, with N threshold processing elements 1302 receiving these signal parameters as input. In turn, the AND-logic 1504 may receive N output signals 1304 from the threshold processing elements 1302.

The integer N represents how many signal parameters are computed for the input signals 120. If N becomes relatively large in a given implementation, the parallel nature of the architectures 1500 may readily scale to large values of N, without introducing significant delays into the overall processing of the architectures 1500 for a given cell. In addition, the parallel nature of the architectures 1500 may lend themselves to implementations that utilize optical-based processing.

Having described in FIG. 15 architectures by which multiple threshold processing elements may be combined to test whether a given input signal falls within a given cell, the discussion now turns to a description of how multiple instances of these architectures may be combined to test multiple cells within a given region. This description is now provided with FIG. 16.

FIG. 16 illustrates architectures, denoted generally at 1600, for testing multiple cells within a given region, to determine whether a given input signal falls within any of these cells. For ease of description, but not to limit possible implementations, FIG. 16 may carry forward some elements from previous drawings, and denote them with identical reference numbers. For example, FIG. 16 elaborates further on the signal classifier 1206, and incorporates representations of signal parameters 1204a and 1204n (collectively, signal parameters 1204) computed from a given input signal (not shown in FIG. 16).

For a first cell 1602a, a set of threshold processing elements 1302a and 1302n may test the signal parameters 1204 to determine whether these parameters fall within the first cell. An instance of AND-logic 1504a may generate an output signal 1506a indicating whether the input signal falls within the cell 1602a.

For at least a second cell 1602m, another set of processing elements 1302b and 1302m may test the signal parameters 1204 to determine whether these parameters fall within the second cell 1602m. Another instance of AND-logic 1504p may generate an output signal 1506p indicating whether the input signal falls within the second cell 1602m.

In turn, OR-logic 1602 may receive the output signals 1506a and 1506p, and produce an output signal 1604, which represents a logical OR operation performed on the signals 1506a and 1506p. This output signal 1604 may indicate whether the input signal falls within any of the cells that define a given region (e.g., 206 in FIG. 2) within an N-dimensional vector space (e.g., 204 in FIG. 2).

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A signal classification system comprising:
a computing system executing a training stage configured to
receive a plurality of training signals associated respectively with predefined signal classes, each of which comprises a set of signals that have at least one common attribute,
receive classification parameters to be used in computing signal parameters so that the predefined signal classes are separated within a vector space,
compute, based upon the classification parameters, at least a first instance of a specified signal parameter from at least a first training signal of the training signals,
associate the first instance of the specified signal parameter with a first predefined signal class of the predefined signal classes, and
store, in a storage element, the first instance of the specified signal parameter as being associated with the first predefined signal class, the first predefined signal class being represented in the storage element by a class representation comprising at least one region to which the first predefined signal class is mapped within the vector space, the region comprising a cell comprising a first N-length vector and thresholds that define at least an edge of the cell within the vector space; and
a classifying stage configured to
receive an input signal for classification,
compute, based upon the classification parameters, at least a second instance of the specified signal parameter from the input signal, the second instance of the specified signal parameter being represented as a second N-length vector, and
compare the first instance of the specified signal parameter to the second instance of the specified signal parameter to determine whether to classify the input signal with the first training signal based upon whether the second N-length vector falls within the cell as defined at least in part by the threshold;
wherein each of the training signals and the input signal are physical quantities that vary with another quantity in terms of time, space, or both; and wherein the training stage is further configured to
create a plurality of sub-cells within the cell that incorporates N-length vectors of at least two of the plurality of training signals, the N-length vectors comprising the first N-length vector of the first training signal,
determine whether the cell contains at least a specified number of the N-length vectors,
in response to determining that the cell contains at least the specified number of the N-length vectors, replace the cell with the sub-cells, and
in response to determining that the cell does not contain at least the specified number of the N-length vectors, retain the cell for further analysis and to eliminate the sub-cells from further analysis.

2. The signal classification system of claim 1, wherein the classifying stage is further configured to output an output signal indicating whether the second N-length vector of the specified signal parameter falls within the threshold.

3. The signal classification system of claim 1, wherein the thresholds comprise an upper threshold and a lower threshold that together define edges of the cell.

4. The signal classification system of claim 3, wherein the classifying stage is further configured to:
determine to classify the input signal with the first training signal based upon the second N-length vector of the specified signal parameter falling within the upper threshold and the lower threshold and so within the cell; and to
output an output signal reflecting that the input signal is classified with the first training signal.

5. The signal classification system of claim 1, wherein the training stage is further configured to create the cell that incorporates N-length vectors of at least two of the plurality of training signals, the N-length vectors comprising the first N-length vector of the first training signal.

6. The signal classification system of claim 1, wherein the training stage is further configured to determine whether any of the sub-cells contain less than a specified number of the N-length vectors.

7. The signal classification system of claim 6, wherein the training stage is further configured to replace the cell with the sub-cells, in response to determining that at least one of the sub-cells contains less than the specified number of the N-length vectors.

8. The signal classification system of claim 6, wherein the training stage is further configured to retain the cell for further analysis and to eliminate the sub-cells from further analysis, in response to determining that none of the sub-cells contains less than the specified number of the N-length vectors.

9. The signal classification system of claim 1, wherein the training stage is further configured to determine whether at least one of the sub-cells contains at least a specified number of the N-length vectors.

10. The signal classification system of claim 9, wherein the training stage is further configured to promote a particular sub-cell of the sub-cells to become a new cell, in response to determining that the particular sub-cell contains at least the specified number of the N-length vectors.

11. The signal classification system of claim 9, wherein the training stage is further configured to eliminate a particular sub-cell of the sub-cells, in response to determining that the particular sub-cell does not contain at least the specified number of the N-length vectors.

12. The signal classification system of claim 1, wherein the input signal is one of the following:
a vibration signal;
a sound signal;
a human speech signal;
a seismic wave signal;
an electrical signal;
an electromagnetic signal;
a radio wave signal;
an image signal; or
a video signal.

13. A method comprising:
receiving, using a classifying stage executing on a computing system, a signal for classification, the input signal comprising a physical quantity that varies with another quantity in terms of time, space, or both;
computing, using the classifying stage executing on the computing system, at least a first instance of a specified signal parameter from the input signal, the first instance of the specified signal parameter being associated with a representation within a vector space;
retrieving, using the classifying stage executing on the computing system, thresholds computed for a training signal that is associated with a predefined class of signals that is represented within the vector space, the thresholds comprising an upper threshold and a lower threshold that together define edges of a cell within the vector space;
creating, using a training stage executing on the computing system, a plurality of sub-cells within the cell that incorporates an N-length vector of the training signal;
determining, using the training stage executing on the computing system, whether the cell contains at least a specified number of N-length vectors;
in response to determining that the cell contains at least the specified number of N-length vectors, replacing, using the training stage executing on the computing system, the cell with the sub-cells;
in response to determining that the cell does not contain at least the specified number of the N-length vectors, retaining, using the training stage executing on the computing system, the cell for further analysis and to eliminate the sub-cells from further analysis;
comparing, using the classifying stage executing on the computing system, the first instance of the specified signal parameter to at least a second instance of the specified signal parameter that is computed from the training signal that is associated with the predefined class of signals; and
classifying, using the classifying stage executing on the computing system, the input signal based upon the comparison of the first instance of the specified signal parameter and the second instance of the specified signal parameter such that the input signal is classified with the training signal upon determining that the representation falls within the upper threshold and the lower threshold and so within the cell.

14. The method of claim 13, wherein the input signal is one of the following:
a vibration signal;
a sound signal;
a human speech signal;
a seismic wave signal;
an electrical signal;
an electromagnetic signal;
a radio wave signal;
an image signal; or a video signal.

15. The method of claim 13, further comprising outputting an output signal indicating that the input signal is classified with the training signal.

* * * * *